(12) United States Patent
Murosawa et al.

(10) Patent No.: US 7,402,220 B2
(45) Date of Patent: Jul. 22, 2008

(54) METHOD FOR MANUFACTURING MULTI-LAYERED UNIT FOR MULTI-LAYERED CERAMIC ELECTRONIC COMPONENT

(75) Inventors: Syougo Murosawa, Tokyo (JP); Shigeki Sato, Tokyo (JP); Masaaki Kanasugi, Tokyo (JP)

(73) Assignee: TDK Corporation, Tokyo (JP)

( * ) Notice: Subject to any disclaimer, the term of this patent is extended or adjusted under 35 U.S.C. 154(b) by 458 days.

(21) Appl. No.: 10/553,536

(22) PCT Filed: Apr. 12, 2004

(86) PCT No.: PCT/JP2004/005200

§ 371 (c)(1),
(2), (4) Date: Oct. 17, 2005

(87) PCT Pub. No.: WO2004/095479

PCT Pub. Date: Nov. 4, 2004

(65) Prior Publication Data

US 2006/0254701 A1 Nov. 16, 2006

(30) Foreign Application Priority Data

Apr. 18, 2003 (JP) .............................. 2003-113832

(51) Int. Cl.
*B32B 37/12* (2006.01)
*H01G 4/12* (2006.01)
*H01G 4/30* (2006.01)

(52) U.S. Cl. ................ 156/89.12; 156/89.16; 156/235; 156/241; 156/289

(58) Field of Classification Search .............. 156/89.12, 156/89.16, 235, 241, 289
See application file for complete search history.

(56) References Cited

U.S. PATENT DOCUMENTS

| | | | | |
|---|---|---|---|---|
| 5,089,071 | A * | 2/1992 | Tominaga et al. | 156/89.17 |
| 6,550,117 | B1 * | 4/2003 | Tokuoka et al. | 29/25.42 |
| 6,602,370 | B1 * | 8/2003 | Kuramitsu et al. | 156/89.12 |
| 7,014,725 | B2 * | 3/2006 | Nagai et al. | 156/89.11 |
| 7,318,874 | B2 * | 1/2008 | Roosen et al. | 156/89.11 |
| 2006/0096693 | A1 * | 5/2006 | Murosawa et al. | 156/89.12 |
| 2006/0130320 | A1 * | 6/2006 | Murosawa et al. | 29/829 |
| 2006/0180269 | A1 * | 8/2006 | Karatsu et al. | 156/230 |
| 2006/0191443 | A1 * | 8/2006 | Yamaguchi et al. | 106/640 |
| 2006/0196592 | A1 * | 9/2006 | Karatsu et al. | 156/60 |
| 2006/0286500 | A1 * | 12/2006 | Murosawa et al. | 432/258 |
| 2007/0017091 | A1 * | 1/2007 | Karatsu et al. | 29/830 |

FOREIGN PATENT DOCUMENTS

| | | |
|---|---|---|
| JP | 63-51616 | 3/1988 |
| JP | 03-250612 | 11/1991 |
| JP | 07-312326 | 11/1995 |
| JP | 08-130152 | 5/1996 |
| JP | 11-238646 | 8/1999 |
| JP | 2000-331865 | 11/2000 |

* cited by examiner

*Primary Examiner*—Melvin C Mayes
(74) *Attorney, Agent, or Firm*—Seed IP Law Group PLLC

(57) ABSTRACT

It is an object of the present invention is to provide a method for manufacturing a multi-layered unit for a multi-layered ceramic electronic component which can prevent a ceramic green sheet from being deformed and destroyed and prevent a solvent contained in an electrode paste from sinking into a ceramic green sheet, thereby enabling manufacture of a multi-layered unit including a ceramic green sheet and an electrode layer laminated to each other in a desired manner.

17 Claims, 13 Drawing Sheets

METHOD FOR MANUFACTURING MULTI-LAYERED UNIT FOR MULTI-LAYERED CERAMIC ELECTRONIC COMPONENT

BACKGROUND OF THE INVENTION

The present invention relates to a method for manufacturing a multi-layered unit for a multi-layered electronic component, and particularly to a method for manufacturing the multi-layered unit for a multi-layered ceramic electronic component which can prevent a ceramic green sheet from being deformed and destroyed and prevent a solvent contained in an electrode paste from sinking into a ceramic green sheet, thereby enabling manufacture of a multi-layered unit including a ceramic green sheet and an electrode layer laminated to each other in a desired manner.

DESCRIPTION OF THE PRIOR ART

Recently, the need to downsize various electronic devices makes it necessary to downsize the electronic components incorporated in the devices and improve the performance thereof. Also in multi-layered ceramic electronic components, such as multi-layered ceramic capacitors, it is strongly required to increase the number of layers and make the laminated unit thinner.

When a multi-layered ceramic electronic component as typified by a multi-layered ceramic capacitor is to be manufactured, ceramic powders, a binder such as an acrylic resin, a butyral resin or the like, a plasticizer such as a phthalate ester, glycol, adipate ester, phosphate ester or the like, and an organic solvent such as toluene, methyl ethyl ketone, acetone or the like are mixed and dispersed, thereby preparing a dielectric paste.

The dielectric paste is then applied onto a carrier film made of polyethylene terephthalate (PET), polypropylene (PP) or the like using an extrusion coater, a gravure coater or the like to form a coating layer and the coating layer is heated to dryness, thereby fabricating a ceramic green sheet.

Further, an electrode paste such as of nickel is printed onto the ceramic green sheet in a predetermined pattern using a screen printer and is dried to form an electrode layer.

When the electrode layer has been formed, the ceramic green sheet on which the electrode layer is formed is peeled off from the carrier film to form a multi-layered unit including the ceramic green sheet and the electrode layer. Then, a ceramic green chip is formed by laminating a desired number of the multi-layered units to form the laminated body, pressing the laminated body and dicing the laminated body.

Finally, the binder is removed from the green chip, the green chip is baked and an external electrode is formed, thereby completing a multi-layered ceramic electronic component such as a multi-layered ceramic capacitor.

At present, the need to downsize electronic components and improve the performance thereof makes it necessary to set the thickness of the ceramic green sheet determining the spacing between layers of a multi-layered ceramic capacitor to be equal to or smaller than 3 μm or 2 μm and to laminate three hundred or more multi-layered units each including a ceramic green sheet and an electrode layer.

However, in the case of printing an electrode paste for an internal electrode onto a ceramic green sheet, thereby forming an electrode layer, there arise problems of a solvent contained in the electrode paste dissolving or swelling a binder component contained in the ceramic green sheet and of the electrode paste sinking into the ceramic green sheet, thereby causing short circuit failure.

Therefore, Japanese Patent Application Laid Open No. 63-51616 and Japanese Patent Application Laid Open No. 3-250612 propose a method including steps of printing a paste for an internal electrode pattern onto another carrier film to form an electrode layer, drying the electrode layer and thermally transferring the thus dried electrode layer onto the surface of a ceramic green sheet.

However, in this method, it is difficult to peel off the carrier film from the electrode layer transferred onto the surface of the ceramic green sheet.

Further, in this method, in order to thermally transfer and bond the dried electrode layer onto the surface of the ceramic green sheet, it is necessary to apply a high pressure onto the ceramic green sheet and the electrode layer at a high temperature and therefore, the ceramic green sheet and the electrode layer tend to be deformed and are sometimes partially destroyed.

SUMMARY OF THE INVENTION

It is therefore an object of the present invention to provide a method for manufacturing a multi-layered unit for a multi-layered ceramic electronic component which can prevent a ceramic green sheet from being deformed and destroyed and prevent a solvent contained in an electrode paste from sinking into a ceramic green sheet, thereby enabling manufacture of a multi-layered unit including a ceramic green sheet and an electrode layer laminated to each other in a desired manner.

The above object of the present invention can be accomplished by a method for manufacturing a multi-layered unit for a multi-layered ceramic electronic component comprising a step of forming a ceramic green sheet on the surface of a first carrier film, a step of forming a release layer on the surface of a second carrier film including a surface-treated region on which a surface treatment is performed for improving releasability and non-surface-treated regions on which no surface treatment is performed on both sides of the surface-treated region and having a width substantially equal to that of the first carrier film, a step of forming an electrode layer in a predetermined pattern and a spacer layer in a complementary pattern to that of the electrode layer on the surface of the release layer, thereby forming an inner electrode layer, a step of forming an adhesive layer on the surface of a third carrier film having a width substantially equal to that of the second carrier film, a step of bringing the surface of the adhesive layer formed on the third carrier film and the surface of the inner electrode layer into close contact with each other and pressing them, thereby bonding the adhesive layer onto the surface of the inner electrode layer, a step of peeling off the third carrier film from the adhesive layer, a step of pressing and bonding the ceramic green sheet formed on the surface of the first carrier film and the inner electrode layer formed on the surface of the second carrier film onto each other via the adhesive layer, and a step of peeling off the first carrier film from the ceramic green sheet, thereby fabricating a multi-layered unit including the ceramic green sheet and the inner electrode layer laminated onto each other, wherein the adhesive layer is formed by coating the surface of the third carrier film with an adhesive agent solution so that the width of the adhesive layer is narrower than the width of the third carrier film by at least 2α where α is a positive value, wider than the width of the ceramic green sheet formed on the surface of the first carrier film and the widths of the release layer and the inner electrode layer formed on the surface of the second carrier film by at least 2α and wider than the width of the surface-treated region of the second carrier film by at least 2α.

According to the present invention, since the ceramic green sheet is transferred onto the surface of the inner electrode layer via the adhesive layer bonded onto the surface of the inner electrode layer, it is possible to transfer the ceramic green sheet onto the surface of the inner electrode layer including the electrode layer and the spacer layer with a low pressure and it is therefore possible to manufacture a multi-layered unit including the ceramic green sheet, the electrode layer and the spacer layer while reliably preventing the ceramic green sheet from being deformed and destroyed.

Further, according to the present invention, since the inner electrode layer including the electrode layer and the spacer layer is bonded onto the surface of the ceramic green sheet via the adhesive layer after the inner electrode layer was formed on the surface of the second carrier film and dried, it is possible to reliably prevent a solvent contained in an electrode paste from dissolving and swelling a binder component contained in the ceramic green sheet and simultaneously prevent the electrode paste from sinking into the ceramic green sheet, thereby manufacturing a multi-layered unit including the ceramic green sheet, the electrode layer and the spacer layer.

Furthermore, according to the present invention, since the adhesive layer is transferred onto the surface of the inner electrode layer including the electrode layer and the spacer layer after the adhesive layer was formed on the surface of the third carrier film and dried, it is possible to reliably prevent the adhesive agent solution from sinking into the electrode layer and the spacer layer and manufacture a multi-layered unit including the ceramic green sheet, the electrode layer and the spacer layer.

Moreover, according to the present invention, since the adhesive layer is transferred onto the surface of the inner electrode layer including the electrode layer and the spacer layer after the adhesive layer was formed on the surface of the third carrier film and dried and the inner electrode layer and the ceramic green sheet are bonded via the adhesive layer, it is possible to reliably prevent the adhesive agent solution from sinking into the ceramic green sheet and manufacture a multi-layered unit including the ceramic green sheet, the electrode layer and the spacer layer.

Further, in the case of laminating a number of multi-layered units each including an electrode layer printed in a predetermined pattern on a ceramic green sheet, since a step is formed between the surface of the electrode layer and the surface of the ceramic green sheet where no electrode layer is formed, a laminated body fabricated by laminating a number of multi-layered units is often deformed and delamination of layers sometimes occurs. However, according to the present invention, since the spacer layer is formed on the surface of the release layer in a complementary pattern to that of the electrode layer, it is possible to effectively prevent a laminated body fabricated by laminating a number of multi-layered units each including the thus formed spacer layer from being deformed and effectively prevent delamination of layers from occurring.

Furthermore, the multi-layered unit is fabricated by coating the surface of a first carrier film continuously conveyed with a dielectric paste to form a ceramic green sheet, coating the surface of a second carrier film continuously conveyed with a dielectric paste to form a release layer, printing the surface of the release layer formed on the second carrier film continuously conveyed with an electrode paste and a dielectric paste to form an inner electrode layer, coating the surface of a third carrier film continuously conveyed with an adhesive agent solution to form an adhesive layer, bringing the surface of the inner electrode layer formed on the second carrier film and the surface of the adhesive layer formed on the third carrier film into contact with each other and pressing them, thereby bonding the adhesive layer onto the surface of inner electrode layer and peeling off the third carrier film from the adhesive layer while the second carrier film and the third carrier film are being continuously conveyed, and bringing the surface of the ceramic green sheet formed on the first carrier film and the surface of the inner electrode layer formed on the second carrier film into contact with each other via the adhesive layer and pressing them, while the first carrier film and the second carrier film are being continuously conveyed, thereby bonding the ceramic green sheet and the inner electrode layer onto each other via the adhesive layer.

However, in the case where the long first carrier film, the long second carrier film and the long third carrier film are conveyed using a sheet conveying mechanism, it is impossible to completely prevent the first carrier film, the second carrier film and the third carrier film from meandering and it is unavoidable for the first carrier film, the second carrier film and the third carrier film to meander within a range of α where α is positive value inherent to the sheet conveying mechanism. Therefore, in the case where the surface of the first carrier film is coated with a dielectric paste to form a ceramic green sheet and the surface of the second carrier film with the adhesive agent solution to form an adhesive layer so that the width of the ceramic green sheet and the width of the adhesive layer are equal to each other, when the ceramic green sheet and the inner electrode layer are bonded onto each other via the adhesive layer, the ceramic green sheet is sometimes present outside of the adhesive layer in a widthwise direction, when the first carrier film is peeled off from the ceramic green sheet. In such a case, portions of the ceramic green sheet which are not bonded to the adhesive layer are often removed together with the first carrier film so that the process is contaminated by the thus removed ceramic green sheet.

On the other hand, in the case where the adhesive layer is present outside of the ceramic green sheet in a widthwise direction when the ceramic green sheet and the inner electrode layer are boded to each other via the adhesive layer, the adhesive layer is sometimes bonded onto the first carrier film and removed together with the first carrier film when the first carrier film is peeled off from the ceramic green sheet and the ceramic green sheet is further removed together with the first carrier film.

However, according to the present invention, since the adhesive layer is formed by coating the surface of the third carrier film with an adhesive agent solution so that the width thereof is wider than the width of the ceramic green sheet formed on the surface of the first carrier film and the widths of the release layer and the inner electrode layer formed on the surface of the second carrier film by at least 2α and wider than the width of the surface-treated region of the second carrier film by at least 2α, when the adhesive layer formed on the third carrier film is transferred onto the surface of the inner electrode layer formed on the second carrier film while the second carrier film and the third carrier film are being conveyed continuously, even if the second carrier film and/or the third carrier film meanders within a range of α, the adhesive layer is reliably bonded onto the surface of the non-surface-treated regions of the second carrier film on which no surface treatment for improving releasability of the second carrier film is performed. Therefore, when the ceramic green sheet and the inner electrode layer are bonded onto each other via the adhesive layer while the first carrier film and the second carrier film are being conveyed continuously, even if the first carrier film and/or the second carrier film meanders within a range of α and the adhesive layer is bonded onto the first carrier film, it is possible to reliably prevent the adhesive layer from being removed together with the first carrier film when the first carrier film is peeled off from the ceramic green sheet.

Moreover, according to the present invention, since the adhesive layer is present outside of the ceramic green sheet whenever the ceramic green sheet and the inner electrode layer are bonded onto each other via the adhesive layer and the entire surface of the ceramic green sheet is bonded onto the adhesive layer, it is possible to reliably prevent the ceramic green sheet from being removed together with the first carrier film when the first carrier film is peeled off from the ceramic green sheet.

Further, in the case where an adhesive layer is formed by coating the surface of a third carrier film with an adhesive agent solution so that the width of the adhesive layer is equal to that of the third carrier film, when the adhesive layer is transferred onto the surface of the inner electrode layer formed on the surface of the second carrier film, the adhesive layer is sometimes present outside of the second carrier film due to meandering of the second carrier film and/or the third carrier film. In such a case, the adhesive layer is bonded onto a transfer roller, whereby the adhesive layer cannot be transferred onto the surface of the inner electrode layer and, in addition, the transfer roller is contaminated.

However, according to the present invention, since the adhesive layer is formed by coating the surface of the third carrier film with the adhesive agent solution so that the width of the adhesive layer is narrower than the width of the third carrier film by at least 2α where α is a positive value, when the adhesive layer is transferred onto the surface of the inner electrode layer formed on the surface of the second carrier film, even if the second carrier film and/or the third carrier film meanders, it is possible to reliably bond the adhesive layer onto the surface of the inner electrode layer and it is therefore possible to reliably prevent the adhesive layer from being bonded onto the surface of a transfer roller.

In a preferred aspect of the present invention, the inner electrode layer is formed by printing the surface of the second carrier film with an electrode paste and a dielectric paste so that the width of the inner electrode layer is wider than that of the surface-treated region by at least 2α.

According to this preferred aspect of the present invention, since the inner electrode layer is formed by printing the surface of the second carrier film with an electrode paste and a dielectric paste so that the width of the inner electrode layer is wider than that of the surface-treated region by at least 2α, the inner electrode layer is securely bonded onto the non-surface-treated regions on which no surface treatment for improving the releasability of the second carrier film is performed and it is therefore possible to reliably keep the inner electrode layer bonded to the surface of the second carrier film when the first carrier film is peeled off from the ceramic green sheet.

In a further preferred aspect of the present invention, the release layer is formed by coating the surface of the second carrier film with a dielectric paste so that the width of the release layer is wider than that of the surface-treated region by at least 2α and the inner electrode layer is formed by printing the surface of the second carrier film with an electrode paste and a dielectric paste so that the width of the inner electrode layer is wider than that of the release layer by at least 2α.

According to this preferred aspect of the present invention, since the release layer is formed by coating the surface of the second carrier film with a dielectric paste so that the width of the release layer is wider than that of the surface-treated region by at least 2α and the inner electrode layer is formed by printing the surface of the second carrier film with an electrode paste and a dielectric paste so that the width of the inner electrode layer is wider than that of the release layer by at least 2α, the release layer is securely bonded onto the surface of the non-surface treated regions on which no surface treatment for improving the releasability of the second carrier film is performed and the inner electrode layer is securely bonded onto the surface of the non-surface treated regions on which no surface treatment for improving the releasability of the second carrier film is performed. It is therefore possible to reliably keep the inner electrode layer and the release layer bonded to the surface of the second carrier film when the first carrier film is peeled off from the ceramic green sheet.

In a further preferred aspect of the present invention, slit processing is performed on the first carrier film, the ceramic green sheet, the adhesive layer, the inner electrode layer, the release layer and the third carrier film in the surface-treated region inside of a region on which the release layer is to be formed by coating the surface of the second carrier film with the dielectric paste.

According to this preferred aspect of the present invention, since slit processing is performed on the first carrier film, the ceramic green sheet, the adhesive layer, the inner electrode layer, the release layer and the third carrier film in the surface-treated region inside of a region on which the release layer is to be formed by coating the surface of the second carrier film with the dielectric paste, even in the case where the coating width of the ceramic green sheet, the coating width of the adhesive layer, the coating width of the release layer and the printing width of the inner electrode layer are set differently for preventing the ceramic green sheet and the adhesive layer from being removed together with the first carrier film when the first carrier film is peeled off from the ceramic green sheet, it is possible to manufacture a multi-layered unit in which the inner electrode layer and the release layer having the same widths are laminated by cutting off at portions on which the slit processing is performed on the ceramic green sheet, the adhesive layer, the inner electrode layer and the release layer located outside of the portions on which the slit processing is performed.

In a further preferred aspect of the present invention, surface treatment is performed on the surface of the first carrier film for improving the releasability thereof and the ceramic green sheet is formed on a region on which the surface treatment is performed.

According to this preferred aspect of the present invention, since surface treatment is performed on the surface of the first carrier film for improving the releasability thereof and the ceramic green sheet is formed on a region on which the surface treatment is performed, it is possible to peel off the first carrier film from the ceramic green sheet in a desired manner.

In the present invention, the dielectric paste used for forming the ceramic green sheet is normally prepared by kneading a dielectric raw material and an organic vehicle obtained by dissolving a binder into an organic solvent.

The dielectric raw material can be selected from among various compounds capable of forming a composite oxide or oxide, such as a carbonate, nitrate, hydroxide, organic metallic compound and the like and mixtures thereof. The dielectric raw material is normally used in the form of a powder whose average particle diameter is about 0.1 μm to about 3.0 μm. The particle diameter of the dielectric raw material is preferably smaller than the thickness of the ceramic green sheet.

The binder used for preparing the organic vehicle is not particularly limited and various known binders such as ethylcellulose, polyvinyl butyral, acrylic resin can be used as the binder for preparing the organic vehicle. However, in order to make the ceramic green sheet thinner, a butyral system resin such as polyvinyl butyral is preferably employed.

The organic solvent used for preparing the organic vehicle is not particularly limited and terpineol, butyl carbitol, acetone, toluene and the like can be used as the organic solvent used for preparing the organic vehicle.

In the present invention, the dielectric paste may be prepared by kneading the dielectric raw material and a vehicle prepared by dissolving a water soluble binder therein.

The water soluble binder used for preparing the dielectric paste is not particularly limited and polyvinyl alcohol, methylcellulose, hydroxyethylcellulose, water soluble acrylic resin, emulsion and the like may be used as the water soluble binder.

The amounts of the respective constituents contained in the dielectric paste are not particularly limited and the dielectric paste may be prepared so as to contain about 1 weight % to about 5 weight % of a binder and about 10 weight % to about 50 weight % of a solvent, for example.

As occasion demands, the dielectric paste may contain additives selected from among various dispersing agents, plasticizers, dielectric materials, accessory ingredient compounds, glass frits, insulating materials and the like. In the case of adding these additives to the dielectric paste, it is preferable to set the total content to be equal to or less than about 10 weight %. In the case where a butyral system resin is employed as the binder resin, it is preferable to set the content of the plasticizer to be about 25 weight parts to about 100 weight parts with respect to 100 weight parts of the binder. When the content of the plasticizer is too small, the ceramic green sheet tends to become brittle and on the other hand, when the content of the plasticizer is too large, the plasticizer oozes out and the ceramic green sheet becomes hard to handle.

In the present invention, a ceramic green sheet is fabricated by applying the dielectric paste onto the surface of a first carrier film to form a coating layer and drying the coating layer.

In the present invention, the ceramic green sheet is preferably formed by coating the surface of the first carrier film with the dielectric paste in such a manner that the width of the ceramic green sheet- is narrower than that of the first carrier film by at least $2\alpha$ and the ceramic green sheet is more preferably formed by coating the surface of the first carrier film with the dielectric paste in such a manner that the width of the ceramic green sheet is the same as that of an inner electrode layer described later.

Here, $\alpha$ is defined as the maximum width within which one side of a sheet may meander when the sheet is conveyed by a sheet conveying mechanism and a value inherent to the sheet conveying mechanism.

Therefore, the value of $\alpha$ depends upon the sheet conveying mechanism for conveying the sheet but is normally about 1 mm to about 2 mm.

The first carrier film normally has a width of about 100 mm to about 400 mm.

The dielectric paste is applied onto the first carrier film using an extrusion coater or wire bar coater, thereby forming a coating layer.

As the first carrier film, a polyethylene terephthalate is employed, for example, and the surface of the first carrier film is coated with a silicon resin, an alkyd resin or the like in order to improve the releasability thereof. The thickness of the first carrier film is not particularly limited but it is preferable for the first carrier film to have a thickness of about 5 μm to about 100 μm.

The thus formed coating layer is dried at a temperature of about 50° C. to about 100° C. for about 1 to about 20 minutes, whereby a ceramic green sheet is formed on the first carrier film.

In the present invention, the thickness of the ceramic green sheet after drying is preferably equal to or thinner than 3 μm and more preferably equal to or thinner than 1.5 μm.

In the present invention, an electrode layer and a spacer layer are printed on a second carrier film using a printing machine such as a screen printing machine, a gravure printing machine or the like.

As the second carrier film, a polyethylene terephthalate sheet is employed, for example, and the surface of the second carrier film is coated with a silicon resin, an alkyd resin or the like in order to improve the releasability thereof, thereby forming a surface-treated region thereon. In the present invention, non-surface-treated regions on which no surface treatment for improving the releasability of the second carrier film is performed are formed on the surface of the second carrier film on both sides of the surface-treated region on which surface treatment for improving the releasability of the second support is performed.

The width of the second carrier film is substantially the same as that of the first carrier film.

In the present invention, prior to forming an electrode layer and a spacer layer on the second carrier film, a dielectric paste is first prepared and applied onto the second carrier film, whereby a release layer is formed on the second carrier film.

The dielectric paste for forming the release layer preferably contains dielectric particles having the same composition as that of dielectric particles contained in the ceramic green sheet.

The dielectric paste for forming the release layer contains, in addition to the dielectric particles, a binder, and, optionally, a plasticizer and a release agent. The size of the dielectric particles may be the same as that of the dielectric particles contained in the ceramic green sheet but is preferably smaller than that of the dielectric particles contained in the ceramic green sheet.

Illustrative examples of binders usable for forming the release layer include acrylic resin, polyvinyl butyral, polyvinyl acetal, polyvinyl alcohol, polyolefin, polyurethane, polystyrene, copolymer thereof, and emulsion thereof.

The binder contained in the dielectric paste for forming the release layer may or may not belong to the same binder group as that the binder contained in the ceramic green sheet belongs to but it preferably belongs to the same binder group as that the binder contained in the ceramic green sheet belongs to.

The binder contained in dielectric paste for forming the release layer contains the binder preferably in an amount of about 2.5 weight % to about 200 weight % with respect to 100 weight parts of the dielectric particles, more preferably in an amount of about 5 weight parts to about 30 weight parts, most preferably in an amount of about 8 weight parts to about 30 weight parts.

The plasticizer contained in the dielectric paste for forming the release layer is not particularly limited and illustrative examples thereof include phthalate ester, adipic acid, phosphate ester, glycols and the like. The plasticizer contained in the dielectric paste for forming the release layer may or may not belong to the same plasticizer group as that the plasticizer contained in the ceramic green sheet belongs to.

The dielectric paste for forming the release layer contains the plasticizer preferably in an amount of about 0 weight % to about 200 weight % with respect to 100 weight parts of the binder, more preferably in an amount of about 20 weight parts to about 200 weight parts, most preferably in an amount of about 50 weight parts to about 100 weight parts.

The releasing agent contained in the dielectric paste for forming the release layer is not particularly limited and illustrative examples thereof include paraffin, wax, silicone oil and the like.

The dielectric paste for forming the release layer contains the releasing agent preferably in an amount of about 0 weight % to about 100 weight % with respect to 100 weight parts of the binder, more preferably in an amount of about 2 weight parts to about 50 weight parts, most preferably in an amount of about 5 weight parts to about 20 weight parts.

In the present invention, it is preferable for the content ratio of the binder to the dielectric material contained in the release layer to be substantially equal to or lower than the content ratio of the binder to the dielectric material contained in the ceramic green sheet. Further, it is preferable for the content ratio of the plasticizer to the dielectric material contained in the release layer to be substantially equal to or higher than the content ratio of the plasticizer to the dielectric material contained in the ceramic green sheet. Moreover, it is preferable for the content ratio of the releasing agent to the dielectric material contained in the release layer to be higher than the content ratio of the releasing agent to the dielectric material contained in the ceramic green sheet.

In the case where the release layer having the above described composition is formed, even if the ceramic green sheet is very thin, the strength of the release layer can be lower than the breaking strength of the ceramic green sheet and it is therefore possible to reliably prevent the ceramic green sheet from being destroyed when the second carrier film is peeled off from the release layer.

The release layer is formed by applying the dielectric paste onto the second carrier film using a wire bar coater or the like.

In the present invention, the release layer is preferably formed by coating the surface of the second carrier film with the dielectric paste so that the width of the release layer is narrower than that of the second carrier film by at least $2\alpha$ and wider than that of the surface-treated region by at least $4\alpha$.

In the present invention, more preferably, the release layer is formed by coating the surface of the second carrier film with the dielectric paste so that the width of the release layer is narrower than that of the second carrier film by at least $4\alpha$ and wider than that of the surface-treated region by at least $4\alpha$.

The thickness of the release layer is preferably equal to or thinner than that of an electrode layer to be formed thereon, more preferably equal to or thinner than about 60% of the electrode layer thickness and most preferably equal to or thinner than about 30% of the electrode layer thickness.

After the release layer has been formed, it is dried at a temperature of about 50° C. to about 100° C. for about 1 to about 10 minutes.

After the release layer has been dried, an electrode layer is formed on the surface of the release layer in a predetermined pattern.

In the present invention, the electrode paste usable for forming the electrode layer is prepared by kneading a conductive material containing any of various conductive metals or alloys, any of various oxides which will form a conductive material containing any of various conductive metals or alloys after baking, an organic metal compound, resinate or the like, and an organic vehicle prepared by dissolving a binder in an organic solvent.

As the conductive material used for preparing the electrode paste, Ni, Ni alloy or the mixture thereof is preferably used. The shape of the conductive material is not particularly limited. The conductive material particles may have a spherical shape or a scale-like shape, or the conductive material may contain spherical conductive material particles and scale-like conductive material particles. The average particle diameter of the conductive material is not particularly limited but a conductive material having an average particle diameter of about 0.1 µm to about 2 µm is normally used for preparing the electrode paste and the conductive material having an average particle diameter of about 0.2 µm to about 1 µm is preferably used for preparing the electrode paste.

The binder for preparing the organic vehicle is not particularly limited. ethylcellulose, acrylic resin, polyvinyl butyral, polyvinyl acetal, polyvinyl alcohol, polyolefin, polyurethane, polystyrene and the copolymer thereof can be used for preparing the organic vehicle and among these, a butyral system such as polyvinyl butyral is particularly preferable for preparing the organic vehicle.

The electrode paste preferably contains the binder in an amount about 2.5 weight parts to about 20 weight parts with respect to 100 weight parts of the conductive material.

As the solvent, a known solvent such as terpineol, butyl carbitol or kerosene can be used. The content of the solvent is preferably about 20 weight % to about 55 weight % with respect to the weight of the electrode paste.

In order to improve adhesion property, it is preferable for the electrode paste to contain a plasticizer.

The plasticizer contained in the electrode paste is not particularly limited and illustrative examples thereof include phthalate ester such as benzyl butyl phthalate (BBP), adipic acid, phosphate ester, glycols and the like. The electrode paste contains the plasticizer preferably in an amount of about 10 weight % to about 300 weight % with respect to 100 weight parts of the binder, more preferably in an amount of about 10 weight parts to about 200 weight parts.

In the case where the amount of the plasticizer added to the electrode paste is too large, the strength of the electrode layer tends to be markedly lower.

The electrode layer is formed by printing the surface of the release layer formed on the second carrier film with the electrode paste using a screen printing machine or a gravure printing machine.

It is preferable to form the electrode layer so as to have a thickness of about 0.1 µm to about 5 µm and it is more preferable to form the electrode layer so as to have a thickness of about 0.1 µm to about 1.5 µm.

A dielectric paste is further printed on the surface of the release layer formed on the second carrier film where no electrode layer is formed using a screen printing machine or a gravure printing machine in a complementary pattern to that of the electrode layer, thereby forming a spacer layer.

It is possible to form the spacer layer on the surface of the release layer formed on the second carrier film in a complementary pattern to that of the electrode layer prior to forming the electrode layer.

In the present invention, the dielectric paste used for forming the spacer layer is prepared in a similar manner to that for preparing the dielectric paste for the ceramic green sheet.

The dielectric paste used for forming the spacer layer preferably contains dielectric particles having the same composition as that of the dielectric particles contained in the ceramic green sheet.

The dielectric paste used for forming the spacer layer preferably contains, in addition to the dielectric particles, a binder, and, optionally, a plasticizer and a release agent. The size of the dielectric particles may be the same as that of the dielectric particles contained in the ceramic green sheet but is preferably smaller than that of the dielectric particles contained in the ceramic green sheet.

Illustrative examples of binders usable for forming the spacer layer include acrylic resin, polyvinyl butyral, polyvinyl acetal, polyvinyl alcohol, polyolefin, polyurethane, polystyrene, copolymer thereof, and emulsion thereof.

The binder contained in dielectric paste for forming the spacer layer may or may not belong to the same binder group as that the binder contained in the ceramic green sheet belongs to but it preferably belongs to the same binder group as that the binder contained in the ceramic green sheet belongs to.

The binder contained in dielectric paste for forming the spacer layer contains the binder preferably in an amount of about 2.5 weight % to about 200 weight % with respect to 100 weight parts of the dielectric particles, more preferably in an amount of about 4 weight parts to about 15 weight parts, most preferably in an amount of about 6 weight parts to about 10 weight parts.

The plasticizer contained in the dielectric paste for forming the spacer layer is not particularly limited and illustrative examples thereof include phthalate ester, adipic acid, phosphate ester, glycols and the like. The plasticizer contained in the dielectric paste for forming the release layer may or may not belong to the same plasticizer group as that the plasticizer contained in the ceramic green sheet belongs to.

The dielectric paste for forming the spacer layer contains the plasticizer preferably in an amount of about 0 weight % to about 200 weight % with respect to 100 weight parts of the binder, more preferably in an amount of about 20 weight parts to about 200 weight parts, most preferably in an amount of about 50 weight parts to about 100 weight parts.

The releasing agent contained in the dielectric paste for forming the spacer layer is not particularly limited and illustrative examples thereof include paraffin, wax, silicone oil and the like.

The dielectric paste for forming the spacer layer contains the releasing agent preferably in an amount of about 0 weight % to about 100 weight % with respect to 100 weight parts of the binder, more preferably in an amount of about 2 weight parts to about 50 weight parts, most preferably in an amount of about 5 weight parts to about 20 weight parts.

In the present invention, an inner electrode layer is constituted by the electrode layer and the spacer layer.

In the present invention, the inner electrode layer including the electrode layer and the spacer layer is preferably formed by coating the surface of the second support surface with the electrode paste and the dielectric paste so that the width of the inner electrode layer is narrower than that of the second carrier film by at least $2\alpha$ and wider than that of the surface-treated region by at least $2\alpha$ and the inner electrode layer is more preferably formed by coating the surface of the second support surface with the electrode paste and the dielectric paste so that the width of the inner electrode layer is wider than that of the release layer by at least $2\alpha$.

In the present invention, it is particularly preferable to form the inner electrode layer by coating the surface of the second support surface with the electrode paste and the dielectric paste so that the width of the inner electrode layer is substantially the same as that of the ceramic green sheet.

Further, in the present invention, it is preferable to form the electrode layer and the spacer layer so that ts/te is equal to or larger than 0.7 and equal to or smaller than 1.2, where ts is the thickness of the spacer layer and te is the thickness of the electrode layer. It is more preferable to form them so that ts/te is equal to or larger than 0.8 and equal to or smaller than 1.2 and it is most preferable to form them so that ts/te is equal to or larger than 0.9 and equal to or smaller than 1.2.

The electrode layer and the spacer layer are dried at a temperature of about 70° C. to about 120° C. for about 5 to about 15 minutes. The drying conditions of the electrode layer and the spacer layer are not particularly limited.

The ceramic green sheet, and the electrode layer and the spacer layer are bonded via an adhesive layer and a third carrier film is prepared in order to form an adhesive layer.

As the third carrier film, a polyethylene terephthalate is employed, for example, and the surface of the third carrier film is coated with a silicon resin, an alkyd resin or the like in order to improve the releasability thereof. The thickness of the third carrier film is not particularly limited but it is preferable for the third carrier film to have a thickness of about 5 μm to about 100 μm.

In the present invention, the third carrier film has substantially the same width as that of the second carrier film and therefore, has substantially the same width as that of the first carrier film.

The adhesive layer is formed by coating the third carrier film with an adhesive agent solution.

In the present invention, the adhesive agent solution contains a binder, and, optionally, a plasticizer, a release agent and an antistatic agent.

The adhesive agent solution may contain dielectric particles having the same composition as that of dielectric particles contained in the ceramic green sheet. In the case where the adhesive agent solution contains dielectric particles, it is preferable for the ratio of the weight of the dielectric particles to the weight of the binder to be less than the ratio of the weight of the dielectric particles contained in the ceramic green sheet to the weight of the binder.

The binder contained in the adhesive agent solution preferably belongs to the same binder group as that the binder contained in the ceramic green sheet belongs to but it is not absolutely necessary for it to belong to the same binder group as that the binder contained in the ceramic green sheet belongs to.

The plasticizer contained in the adhesive agent solution preferably belongs to the same plasticizer group as that the plasticizer contained in the dielectric paste for forming the ceramic green sheet belongs to but it is not absolutely necessary for it to belong to the same plasticizer group as that the plasticizer contained in the dielectric paste for forming the ceramic green sheet belongs to.

The content of the plasticizer is preferably about 0 weight % to about 200 weight % with respect to 100 weight parts of the binder, more preferably about 20 weight parts to about 200 weight parts, and most preferably about 50 weight parts to about 100 weight parts.

In the present invention, the adhesive agent solution preferably contains an antistatic agent in an amount of 0.01 weight % to 15 weight % of the binder and more preferably contains an antistatic agent in an amount of 0.01 weight % to 10 weight % of the binder.

In the present invention, the antistatic agent contained in the adhesive agent solution is not particularly limited insofar as it is an organic solvent having a hygroscopic property and illustrative examples of the antistatic agent contained in the adhesive agent solution include ethylene glycol, polyethylene glycol, 2-3 butanediol, glycerin, an ampholytic surfactant such as an imidazoline system surfactant, a polyalkylene glycol derivative system surfactant and a carboxylic acid amidine salt system surfactant, and the like.

Among these, an ampholytic surfactant such as an imidazoline system surfactant, a polyalkylene glycol derivative system surfactant or a carboxylic acid amidine salt system surfactant is preferable since a small amount thereof can prevent static charge from being generated and enable peel-off of the third carrier film from the adhesive layer with a small releasing force, and an imidazoline system surfactant is particularly preferable since it enables peel-off the third carrier film from the adhesive layer with a very small releasing force.

The adhesive agent solution is applied onto the third carrier film using a bar coater, an extrusion coater, a reverse coater, a dip coater, a kiss coater or the like, thereby forming the adhesive layer so as to preferably have a thickness of about 0.02 μm to about 0.3 μm, more preferably have a thickness of about 0.02 μm to about 0.1 μm. In the case where the thickness of the adhesive layer is thinner than about 0.02 μm, the adhesion force is lowered and on the other hand, in the case where the thickness of the adhesive layer exceeds about 0.3 μm, defects (empty spaces) tend to be generated.

In the present invention, the adhesive layer is formed by coating the surface of the third carrier film with the adhesive agent solution so that the width of the adhesive layer is narrower than that of the third carrier film by at least 2α where α is a positive value, wider than the width of the ceramic green sheet formed on the surface of the first carrier film and the widths of the release layer and the inner electrode layer formed on the surface of the second carrier film by at least 2α and wider than the width of the surface-treated region of the second carrier film by at least 2α.

The adhesive layer is dried at a temperature between room temperature (25° C.) and about 80° C. for about 1 to about 5 minutes, for example. The drying conditions of the adhesive layer are not particularly limited.

The adhesive layer formed on the third carrier film is transferred onto the surfaces of the electrode layer and the spacer layer formed on the second carrier film.

When the adhesive layer is to be transferred, it is kept in contact with the surfaces of the electrode layer and the spacer layer formed on the second carrier film, and the adhesive layer, the electrode layer and spacer layer are pressed at a temperature of about 40° C. to about 100° C. under a pressure of about 0.2 MPa to about 15 MPa, preferably under a pressure of 0.2 MPa to about 6 MPa, whereby the adhesive layer is bonded onto the surface of the electrode layer and the spacer layer. Afterward, the third carrier film is peeled off from the adhesive layer.

When the adhesive layer is to be transferred onto the electrode layer and the spacer layer, the second carrier film formed with the electrode layer and the spacer layer and the third carrier film formed with the adhesive layer may be pressed onto each other using a pressing machine or using a pair of pressure rollers but it is preferable to press the second carrier film and the third carrier film onto each other using a pair of pressure rollers.

Then, the ceramic green sheet and the electrode and spacer layers are bonded to each other via the adhesive layer.

The ceramic green sheet and the electrode and spacer layers are pressed at a temperature of about 40° C. to about 100° C. under a pressure of about 0.2 MPa to about 15 MPa, preferably under a pressure of 0.2 MPa to about 6 MPa, whereby the ceramic green sheet is bonded onto the electrode layer and spacer layer via the adhesive layer.

Preferably, the ceramic green sheet, the adhesive layer, and the electrode and spacer layers are pressed onto each other using a pair of pressure rollers and the ceramic green sheet and the electrode and spacer layers are bonded to each other via the adhesive layer.

When the ceramic green sheet and the electrode and spacer layers have been bonded to each other via the adhesive layer, the first carrier film is peeled off from the ceramic green sheet.

Then, an adhesive layer is transferred onto the surface of the ceramic green sheet similarly to the case of transferring the adhesive layer formed on the surface of the third carrier film onto the surface of the electrode layer and the spacer layer.

A laminated body is thus obtained and is cut to a predetermined size, thereby fabricating a multi-layered unit including the release layer, the electrode layer, the spacer layer, the adhesive layer, the ceramic green sheet and the adhesive layer laminated on the second carrier film in this order.

A number of the thus fabricated multi-layered units are laminated, thereby fabricating a multi-layered block.

When a number of the multi-layered units are to be laminated, a base substrate is first fixed onto a substrate and the multi-layered unit is positioned in such a manner that the adhesive layer formed on the ceramic green sheet comes into close contact with the surface of the base substrate and a pressure is applied onto the multi-layered unit.

As the base substrate, a polyethylene terephthalate film is employed, for example.

The thickness of the base substrate is not particularly limited insofar as it can support the multi-layered unit.

When the adhesive layer formed on the ceramic green sheet has been bonded onto the surface of the base substrate, the second carrier film is peeled off from the release layer.

Further, a new multi-layered unit is positioned so that an adhesive layer formed on a ceramic green sheet thereof comes into close contact with the release layer of the multi-layered unit bonded onto the base substrate and pressed toward the substrate, thereby laminating the new multi-layered unit on the multi-layered unit bonded onto the base substrate.

Then, the second carrier film of the newly laminated multi-layered unit is peeled off from the release layer thereof.

Similarly to the above, a predetermined number of multi-layered blocks are laminated, thereby fabricating a multi-layered block and a predetermined number of the multi-layered blocks are laminated, whereby a multi-layered ceramic electronic component is manufactured.

The above and other objects and features of the present invention will become apparent from the following description made with reference to the accompanying drawings.

DESCRIPTION OF THE PREFERRED EMBODIMENTS

A method for manufacturing a multi-layered ceramic capacitor which is a preferred embodiment of the present invention will now be described with reference to accompanying drawings.

When a multi-layered ceramic capacitor is to be manufactured, a dielectric paste is first prepared in order to fabricate a ceramic green sheet.

The dielectric paste is normally prepared by kneading a dielectric raw material and an organic vehicle obtained by dissolving a binder into an organic solvent.

The resultant dielectric paste is applied onto a first carrier film using an extrusion coater or wire bar coater, thereby forming a coating layer.

As the first carrier film, a polyethylene terephthalate sheet is employed, for example, and the surface of the first carrier film is coated with a silicon resin, an alkyd resin or the like in order to improve the releasability thereof. The thickness of the first carrier film is not particularly limited but it is preferable for the first carrier film to have a thickness of about 5 μm to about 100 μm.

The thus formed coating layer is dried at a temperature of about 50° C. to about 100° C. for about 1 to about 20 minutes, whereby a ceramic green sheet is formed on the first carrier film.

The thickness of the ceramic green sheet after drying is preferably equal to or thinner than 3 μm and more preferably equal to or thinner than 1.5 μm.

In this embodiment, the ceramic green sheet 2 is formed by coating the surface of the first carrier film with the dielectric paste in such a manner that the width of the ceramic green sheet is narrower than that of the first carrier film by at least 4α and substantially the same as that of an inner electrode layer including an electrode layer and a spacer layer described later.

Here, α is defined as the maximum width within which one side of a sheet may meander when the sheet is conveyed by a sheet conveying mechanism and a value inherent to the sheet conveying mechanism. In other words, in this embodiment, a sheet conveying mechanism for conveying the first carrier film is controlled so that meandering of the first carrier film stays within a range of α when the first carrier film is continuously conveyed.

The value of α depends upon the sheet conveying mechanism for conveying the sheet but is normally about 1 mm to about 2 mm.

The first carrier film normally has a width of about 100 mm to about 400 mm.

Figure 1:
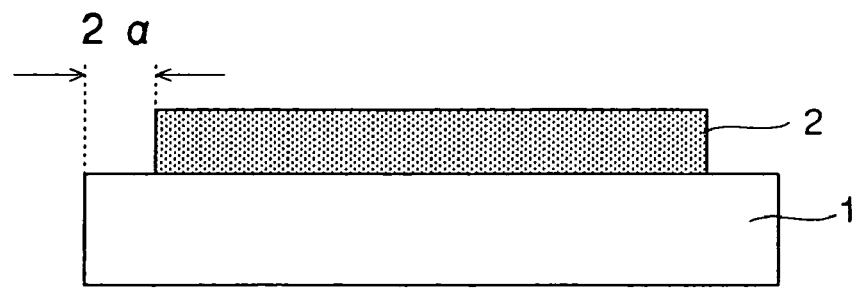
FIG. 1 is a schematic cross-sectional view showing how a ceramic green sheet is formed on a first carrier film.

FIG. 1 is a schematic cross-sectional view showing how the ceramic green sheet is formed on the first carrier film.

Actually, the first carrier film 1 is long and the ceramic green sheet 2 is continuously formed on the long first carrier film 1.

On other hand, a second carrier film is prepared independently of the first carrier film 1 formed with the ceramic green sheet 2 and a release layer, an electrode layer and a spacer layer are formed on the second carrier film.

Figure 2:
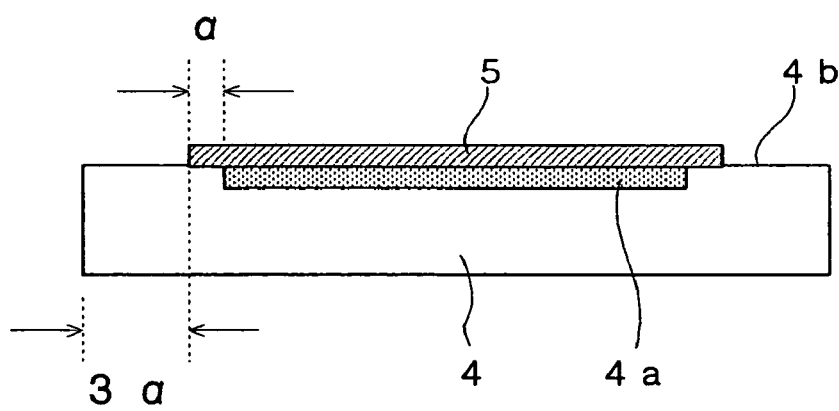
FIG. 2 is a schematic cross-sectional view showing a second carrier film formed with a release layer on the surface thereof.

FIG. 2 is a schematic partial cross-sectional view showing a second carrier film 4 formed with a release layer 5 on the surface thereof.

Actually, the second carrier film 4 is long and the release layer 5 is continuously formed on the surface of the second carrier film 4 and the electrode layer 6 is formed on the surface of the release layer 5 in a predetermined pattern.

In this embodiment, the second carrier film 4 has substantially the same width ad that of the first carrier film 1.

As the second carrier film 4, a polyethylene terephthalate sheet is employed, for example. The thickness of the second carrier film 4 is not particularly limited and may be the same as or different from that of the first carrier film 1 on which the ceramic green sheet 2 is formed but it is preferable for the second carrier film 4 to have a thickness of about 5 μm to about 100 μm.

In this embodiment, as shown in FIG. 2, the surface of the second carrier film 4 is formed with a surface-treated region 4a coated with a silicon resin, an alkyd resin or the like in order to improve the releasability of the second carrier film and non-surface-treated regions 4b on which no surface treatment for improving the releasability of the second carrier film is performed on both sides of the surface-treated region 4a.

When the release layer 5 is to be formed on surface of the second carrier film 4, a dielectric paste for forming the release layer 5 is prepared in a similar manner to that for forming the ceramic green sheet 2.

A dielectric paste for forming the release layer 5 preferably contains dielectric particles having the same composition as that of dielectric particles contained in the ceramic green sheet 2.

The binder contained in the dielectric paste for forming the release layer 5 may or may not belong to the same binder group as that the binder contained in the ceramic green sheet 2 belongs to but it preferably belongs to the same binder group as that the binder contained in the ceramic green sheet 2 belongs to.

When the dielectric paste has been prepared in this manner, the surface of the second carrier film 4 is coated with the dielectric paste using a wire bar coater (not shown), thereby forming the release layer 5.

In this embodiment, as shown in FIG. 2, the release layer is formed by coating the surface of the second carrier film 4 with the dielectric paste so that the width of the release layer is narrower than the that of the second carrier film 4 by $6\alpha$ and wider than that of the surface-treated region 4a by $2\alpha$.

Here, $\alpha$ is defined as the maximum width within which one side of a sheet may meander when the sheet is conveyed by a sheet conveying mechanism and a value inherent to the sheet conveying mechanism. In other words, in this embodiment, the sheet conveying mechanism for conveying the second carrier film 4 is controlled so that meandering of the second carrier film 4 stays within a range of a when the second carrier film 4 is continuously conveyed.

FIG. 2 show an ideal case where the release layer could be formed while suppressing the meandering width $\alpha$ of the second carrier film 4 to zero.

The thickness of the release layer 5 is preferably equal to or thinner than that of an electrode layer 6 to be formed thereon, more preferably equal to or thinner than about 60% of the electrode layer thickness and most preferably equal to or thinner than about 30% of the electrode layer thickness.

After the release layer 5 has been formed, the release layer 5 is dried at a temperature of about 50° C. to about 100° C. for about 1 to about 10 minutes.

After the release layer 5 has been dried, an electrode layer 6 which will form an inner electrode layer after baking is formed on the surface of the release layer 5 in a predetermined pattern and a spacer layer is further formed on the surface of the release layer 5 where no electrode layer 6 is formed in a complementary pattern to that of the electrode layer 6.

Figure 3:
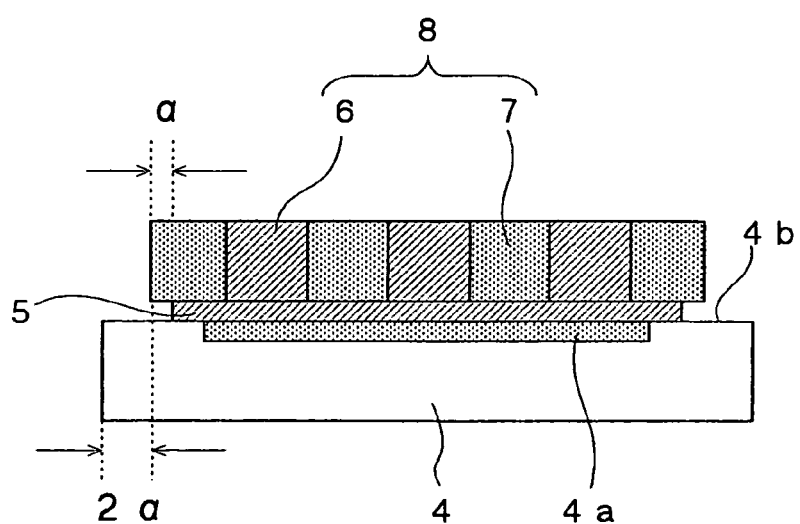
FIG. 3 is a schematic cross-sectional view showing a second carrier film formed with an electrode layer and a spacer layer on the surface of a release layer.

FIG. 3 is a schematic cross-sectional view showing how the electrode layer 6 and the spacer layer 7 are formed on the surface of the release layer 5.

When the electrode layer 6 is to be formed on the release layer 5 formed on the second carrier film 4, an electrode paste is first prepared by kneading a conductive material containing any of various conductive metals or alloys, any of various oxides which will form a conductive material containing any of various conductive metals or alloys after baking, an organic metal compound, resinate or the like, and an organic vehicle prepared by dissolving a binder in an organic solvent.

As the conductive material used for preparing the electrode paste, Ni, Ni alloy or a mixture thereof is preferably used.

The average particle diameter of the conductive material is not particularly limited but a conductive material having an average particle diameter of about 0.1 µm to about 2 µm is normally used for preparing the electrode paste and a conductive material having an average particle diameter of about 0.2 µm to about 1 µm is preferably used for preparing the electrode paste.

The electrode layer 6 is formed by printing the surface of the release layer formed on the second carrier film with the electrode paste on using a screen printing machine or a gravure printing machine.

It is preferable to form the electrode layer 6 so as to have a thickness of about 0.1 µm to about 5 µm and it is more preferable to form the electrode layer so as to have a thickness of about 0.1 µm to about 1.5 µm.

After forming the electrode layer 6 having the predetermined pattern on the surface of the release layer 5 using a screen printing process or a gravure printing process, a spacer layer is formed on the surface of the release layer 5 where no electrode layer 6 is formed in a complementary pattern to that of the electrode layer 6.

The spacer layer 7 can be formed on regions of the release layer 5 other than regions where the electrode layer 6 will be formed prior to forming the electrode layer 6 on the surface of the release layer 5.

When the spacer layer 7 is to be formed, a dielectric paste having a similar composition to that of the dielectric paste used for forming the ceramic green sheet is prepared and a screen printing process or a gravure printing process is used to print the dielectric paste on the surface of the release layer 5 where no electrode layer 6 is formed in a complementary pattern to that of the electrode layer 6.

An inner electrode layer 8 is formed by the electrode layer 6 and the spacer layer 7. In this embodiment, as shown in FIG. 3, the inner electrode layer 8 is formed by printing the electrode paste and the dielectric paste onto the surface of the second carrier film 4 so that the width of the inner electrode layer 8 is narrower than that of the second carrier film 4 by $4\alpha$, wider than that of the release layer 5 by $2\alpha$ and substantially the same as that of the ceramic green sheet 2.

Therefore, portions of the inner electrode layer 8 in the vicinity of opposite side edges thereof are formed on the non-surface-treated regions 4b on which no surface treatment for improving the releasability of the second carrier film 4 is performed.

FIG. 2 shows an ideal case where the inner electrode layer 8 could be formed while suppressing the meandering width $\alpha$ of the second carrier film 4 to zero.

In this embodiment, the spacer layer 7 is formed on the release layer 5 so that ts/te is equal to 1.1, where ts is the thickness of the spacer layer 7 and te is the thickness of the electrode layer 6.

In this embodiment, the ceramic green sheet 2, and the electrode layer 6 and the spacer layer 7 are bonded via an adhesive layer and a third carrier film is further prepared independently of the first carrier film 1 on which the ceramic green sheet 2 is formed and the second carrier film 4 on which the electrode layer 6 and the spacer layer 7 are formed and an adhesive layer is formed on the third carrier film, thereby fabricating an adhesive layer sheet.

Figure 4:
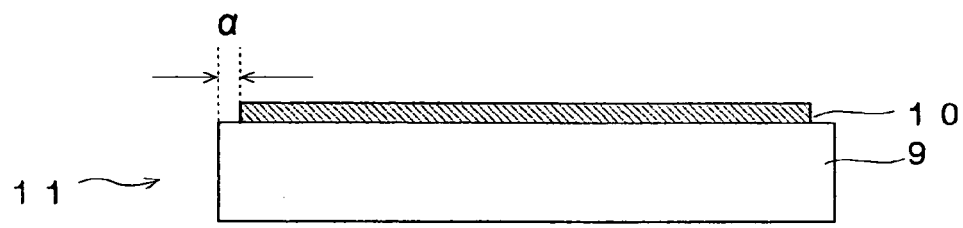
FIG. 4 is a schematic cross-sectional view showing an adhesive layer sheet obtained by forming an adhesive layer on the surface of a third carrier film.

FIG. 4 is a schematic partial cross-sectional view showing the adhesive layer sheet in which an adhesive layer is formed on the surface of a third carrier film.

Actually, the third carrier film 9 is long and the adhesive layer 10 is continuously formed on the long third carrier film 9.

In this embodiment, the third carrier film 9 has substantially the same width as that of the second carrier film 4 and therefore, has substantially the same width as that of the first carrier film 1.

As the third carrier film 9, a polyethylene terephthalate sheet is employed, for example, and the surface of the third carrier film 9 is coated with a silicon resin, an alkyd resin or the like in order to improve the releasability thereof. The thickness of the third carrier film 9 is not particularly limited but it is preferable for the third carrier film 9 to have a thickness of about 5 µm to about 100 µm.

When the adhesive layer 10 is to be formed, an adhesive agent solution is first prepared.

In this embodiment, the adhesive agent solution contains a binder, and, optionally, a plasticizer, a release agent and an antistatic agent.

The adhesive agent solution may contain dielectric particles having the same composition as that of dielectric particles contained in the ceramic green sheet. In the case where the adhesive agent solution contains dielectric particles, it is preferable for the ratio of the weight of the dielectric particles to the weight of the binder to be less than the ratio of the weight of the dielectric particles contained in the ceramic green sheet to the weight of the binder.

The binder contained in the adhesive agent solution preferably belongs to the same binder group as that the binder contained in the ceramic green sheet belongs to but it is not absolutely necessary for it to belong to the same binder group as that the binder contained in the ceramic green sheet belongs to.

The plasticizer contained in the adhesive agent solution preferably belongs to the same plasticizer group as that the plasticizer contained in the dielectric paste for forming the ceramic green sheet belongs to but it is not absolutely necessary for it to belong to the same plasticizer group as that the plasticizer contained in the dielectric paste for forming the ceramic green sheet belongs to.

The content of the plasticizer is preferably about 0 weight % to about 200 weight % with respect to 100 weight parts of the binder, more preferably about 20 weight parts to about 200 weight parts, and most preferably about 50 weight parts to about 100 weight parts.

In this embodiment, the adhesive agent solution contains an antistatic agent in an amount of 0.01 weight % to 15 weight % of the binder.

In this embodiment, as the antistatic agent, an imidazoline system surfactant is employed.

The thus prepared adhesive agent solution is applied onto the third carrier film 9 using a bar coater, an extrusion coater, a reverse coater, a dip coater, a kiss coater or the like, thereby forming the adhesive layer 10 so as to preferably have a thickness of about 0.02 µm to about 0.3 µm, more preferably have a thickness of about 0.02 µm to about 0.1 µm. In the case where the thickness of the adhesive layer 10 is thinner than about 0.02 µm, the adhesion force is lowered and, on the other hand, in the case where the thickness of the adhesive layer 10 exceeds about 0.3 µm, defects (empty spaces) tend to be generated.

In this embodiment, the adhesive layer 10 is formed by coating the surface of the third carrier film 9 with the adhesive agent solution so that the width of the adhesive layer 10 is narrower than that of the third carrier film 9 by 2α, wider than the width of the ceramic green sheet 2 formed on the surface of the first carrier film 1 and the widths of the release layer 5 and the inner electrode layer 8 formed on the surface of the second carrier film 4 by 2α and wider than that of the surface-treated region 4a of the second carrier film 4 by 2α.

Here, α is defined as the maximum width within which one side of a sheet may meander when the sheet is conveyed by a sheet conveying mechanism and a value inherent to the sheet conveying mechanism. In other words, in this embodiment, the sheet conveying mechanism for conveying the third carrier film 9 is controlled so that meandering of the third carrier film 9 stays within a range of a when the third carrier film 9 is continuously conveyed.

The adhesive layer 10 is dried at a temperature between room temperature (25° C.) and about 80° C. for about 1 to about 5 minutes, thereby forming the adhesive sheet 11. The drying conditions of the adhesive layer 10 are not particularly limited.

Figure 5:
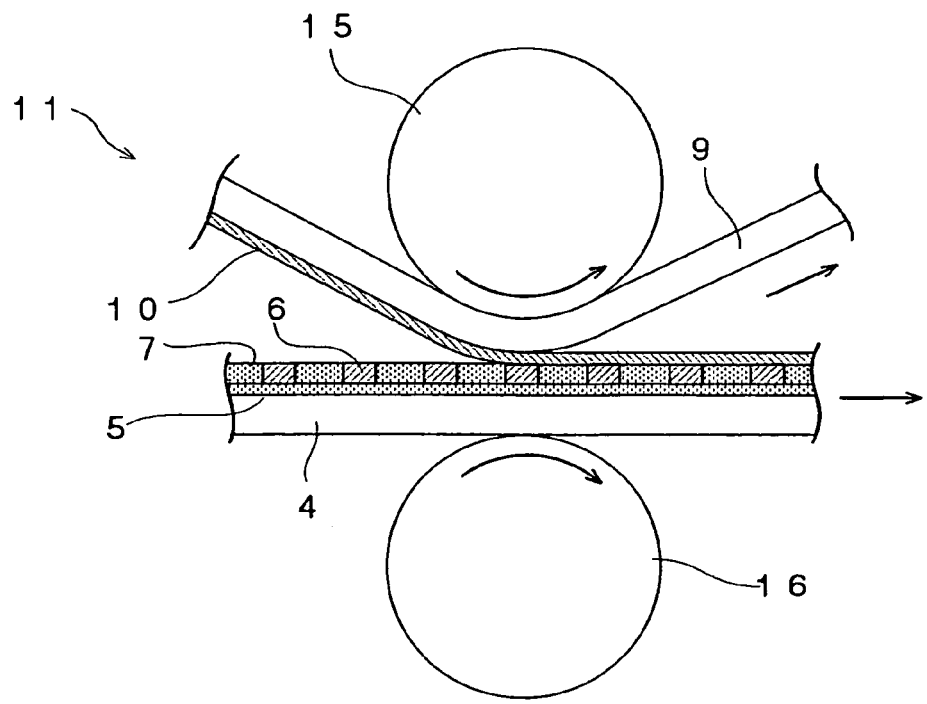
FIG. 5 is a schematic cross-sectional view showing a preferred embodiment of an adhering and peeling apparatus for bonding an adhesive layer formed on a third carrier film onto the surface of an inner electrode layer including an electrode layer and a spacer layer and formed on a second carrier film and peeling off the third carrier film from the adhesive layer.

FIG. 5 is a schematic cross-sectional view showing a preferred embodiment of an adhering and peeling apparatus for bonding the adhesive layer 10 formed on the third carrier film 9 onto the surface of the inner electrode layer 8 including the electrode layer 6 and the spacer layer 7 formed on the second carrier film 4 and peeling off the third carrier film 9 from the adhesive layer 10.

As shown in FIG. 5, the adhering and peeling apparatus according to this embodiment includes a pair of pressure rollers 15, 16 whose temperature is held at about 40° C. to about 100° C.

As shown in FIG. 5, the third carrier film 9 formed with the adhesive layer 10 is fed to a portion between the pair of pressure rollers 15, 16 from an obliquely upper location in such a manner that the third carrier film 9 is wound around part of the upper pressure roller 15 by a tensile force applied to the third carrier film 9. On the other hand, the second carrier film 4 formed with the electrode layer 6 and the spacer layer 7 is fed to a portion between the pair of pressure rollers 15, 16 in a substantially horizontal direction in such a manner that the second carrier film 4 comes into contact with the lower pressure roller 16 and the electrode layer 6 and the spacer layer 7 come into contact with the adhesive layer 10 formed on the third carrier film 9.

The feed rates of the second carrier film 4 and the third carrier film 9 are set to 2 m/sec, for example, and the nip pressure between the pair of pressure rollers 15, 16 is preferably set between about 0.2 MPa and about 15 MPa and more preferably between about 0.2 Mpa and about 6 Mpa.

As a result, the adhesive layer 10 formed on the third carrier film 9 is bonded to the surfaces of the electrode layer 6 and the spacer layer 7 formed on the second carrier film 4.

In this embodiment, since the adhesive layer 10 is formed by coating the surface of the third carrier film 9 with the adhesive agent solution so that the width of the adhesive layer 10 is narrower than that of the third carrier film 9 by 2α, even if the third carrier film 9 meanders within a range of α when the adhesive layer 10 is formed and even if the second carrier film 4 and/or the third carrier film 9 meanders within a range of α when the adhesive layer 10 is transferred onto the surface of the inner electrode layer 8, it is possible to reliably prevent the adhesive layer 10 from being located outside of the second carrier film 4 in a widthwise direction and it is therefore possible to reliably prevent the adhesive layer 10 from being bonded onto the surface of the transfer roller 16.

As shown in FIG. 5, the third carrier film 9 formed with the adhesive layer 10 is fed obliquely upward from the portion between the pair of pressure rollers 15, 16 and the third carrier film 9 is peeled off from the adhesive layer 10 bonded to the electrode layer 6 and the spacer layer 7.

When the third carrier film 9 is peeled off from the adhesive layer 10, if static charge should be generated so that dust attaches to the adhesive layer 10 and the adhesive layer 10 is attracted to third carrier film 9, it would become difficult to peel off the third carrier film 9 from the adhesive layer 10. However, in this embodiment, the adhesive layer 10 contains an imidazoline system surfactant in an amount of 0.01 weight % to 15 weight % of the binder, so that generation of static charge can be effectively prevented.

Figure 6:
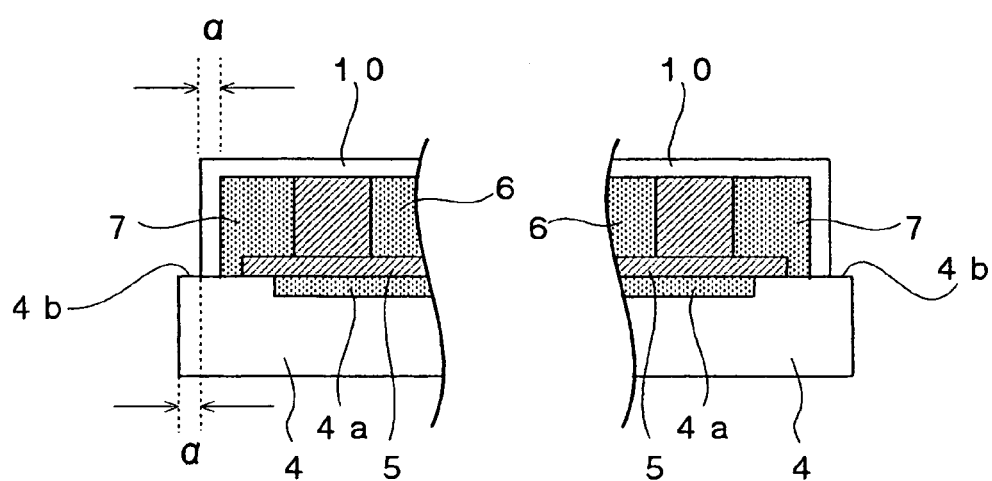
FIG. 6 is a schematic partial cross-sectional view showing how an adhesive layer is bonded onto the surface of an inner electrode layer including an electrode layer and a spacer layer and formed on a second carrier film and a third carrier film is peeled off from the adhesive layer.

FIG. 6 shows how the adhesive layer 10 is bonded onto the surface of the inner electrode layer 8 including the electrode layer 6 and the spacer layer 7 and formed on the second carrier film 4 and the third carrier film 9 is peeled off from the adhesive layer 10 and shows an ideal case where the adhesive layer 10 could be transferred onto the inner electrode layer 8 while suppressing the meandering width α of each of the second carrier film 4 and the third carrier film 9 to zero.

As shown in FIG. 6, the adhesive layer 10 is formed so that one of the side edge portions thereof is located inside of the side edge portion of the second carrier film 4 by α, outside of the side edge portion of the inner electrode layer 8 by α and outside of the side edge portion of the release layer 5 by 2α, and the adhesive layer 10 is pressed by the pair of pressure rollers 15, 16 to be bonded onto the non-surface-treated regions 4b on which no surface treatment for improving the releasability of the second carrier film is performed outside of the inner electrode layer 8.

As shown in FIG. 6, the inner electrode layer 8 is also pressed by the pair of pressure rollers 15, 16 to be bonded onto the non-surface-treated regions 4b on which no surface treatment is performed.

When the adhesive layer 10 has been bonded to the surfaces of the electrode layer 6 and the spacer layer 7 formed on the second carrier film 4 and the third carrier film 9 has been peeled off from the adhesive layer 10 in this manner, the electrode layer 6 and the spacer layer 7 are bonded onto the surface of the ceramic green sheet 2 formed on the first carrier film 1 via the adhesive layer 10.

Figure 7:
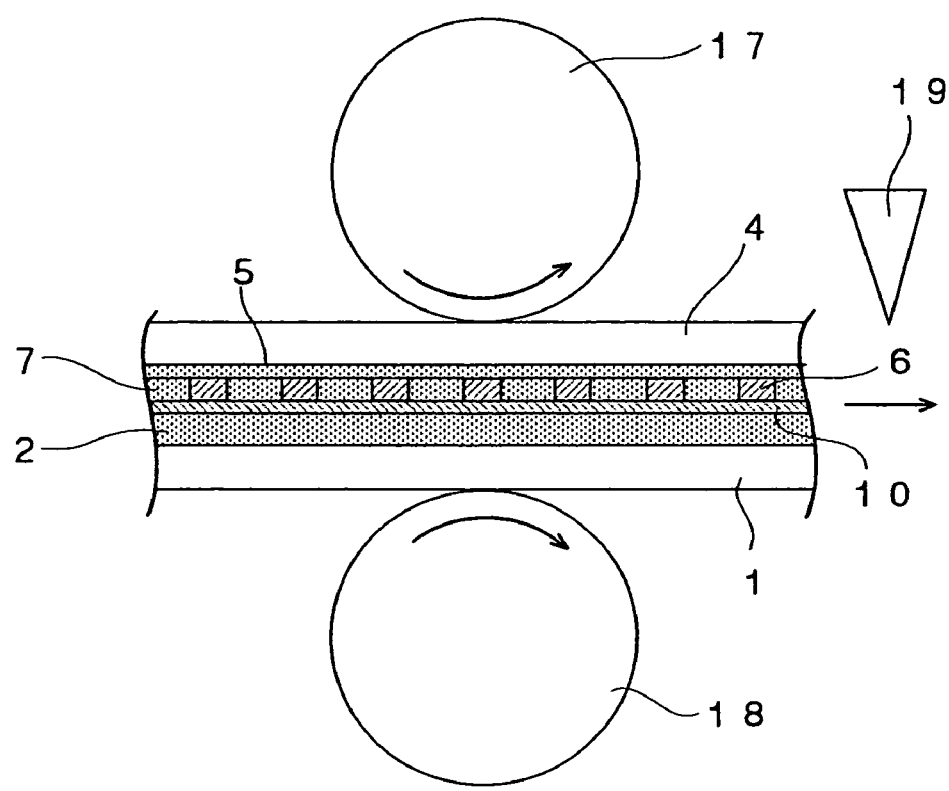
FIG. 7 is a schematic cross-sectional view showing a preferred embodiment of an adhering apparatus for bonding an electrode layer and a spacer layer onto the surface of a ceramic green sheet via an adhesive layer.

FIG. 7 is a schematic cross-sectional view showing a preferred embodiment of an adhering apparatus for bonding the electrode layer 6 and the spacer layer 7 onto the surface of the ceramic green sheet 2 via the adhesive layer 10.

As shown in FIG. 7, the adhering apparatus according to this embodiment includes a pair of pressure rollers 17, 18 whose temperature is held at about 40° C. to about 100° C. and a slit processing machine 19 downstream of the pair of pressure rollers 17, 18.

The second carrier film 4 formed with the inner electrode layer 8 including the electrode layer 6, the spacer layer 7 and the adhesive layer 10 is fed to a portion between the pair of pressure rollers 17, 18 in such a manner that the second carrier film 4 comes into contact with the upper pressure roller 17 and, on the other hand, the first carrier film 1 formed with the ceramic green sheet 2 is fed to the portion between the pair of pressure rollers 17, 18 in such a manner that the first carrier film 1 comes into contact with the lower pressure roller 18.

In this embodiment, the pressure roller 17 is constituted as a metal roller and the pressure roller 18 is constituted as a rubber roller.

The feed rates of the first carrier film 1 and the second carrier film 4 and are set to 2 m/sec, for example, and the nip pressure between the pair of pressure rollers 15, 16 is preferably set between about 0.2 MPa and about 15 MPa and more preferably between about 0.2 Mpa and about 6 Mpa.

In this embodiment, the ceramic green sheet 2 and the inner electrode layer 8 including the electrode and spacer layers 6, 7 are bonded to each other via the adhesive layer 10 and, unlike in the conventional process, they are not bonded utilizing the agglutinant forces of binders contained in the ceramic green sheet 2, the electrode layer 6 and spacer layer 7 or the deformation of the ceramic green sheet 2, the electrode layer 6 and the spacer layer 7. It is therefore possible to bond the ceramic green sheet 2 and the inner electrode layer 8 including the electrode and the spacer layers 6, 7 with a low pressure such as about 0.2 MPa to about 15 Mpa.

Therefore, since it is possible to prevent the ceramic green sheet 2, the electrode layer 6 and the spacer layer 7 from deforming, a multi-layered ceramic capacitor can be manufactured with high accuracy by laminating the thus formed laminated bodies including the ceramic green sheet 2 and the inner electrode layer 8.

Furthermore, in this embodiment, since the electrode layer 6 formed on the second carrier film 4 is bonded onto the surface of the ceramic green sheet 2 via the adhesive layer 10 after the electrode layer 6 has been dried, unlike in the case where the electrode layer 6 is formed by printing an electrode paste on the surface of the ceramic green sheet 2, the electrode paste neither dissolves nor swells the binder contained in the ceramic green sheet 2 and the electrode paste does not seep into the ceramic green sheet 2. It is therefore possible to form the electrode layer 6 on the surface of the ceramic green sheet 2.

Moreover, in this embodiment, since the adhesive layer 10 is formed by coating the surface of the third carrier film 9 with the adhesive agent solution so that the width of the adhesive layer 10 is narrower than that of the third carrier film 9 by 2α and wider than that of the ceramic green sheet 2 formed on the first carrier film 1 and that of the inner electrode layer 8 formed on the second carrier film 4 by 2α, the adhesive layer 10 is securely bonded onto the non-surface-treated regions 4b on which no surface treatment for improving the releasability of the second carrier film is performed outside of the inner electrode layer 8 and on the other hand, the entire surface of the ceramic green sheet 2 formed on the first carrier film 1 is bonded onto the adhesive layer 10.

After bonding the ceramic green sheet 2 and the inner electrode layer 8 via the adhesive layer 10 by the pair of pressure rollers 17, 18, slit processing is performed by the slit processing machine 19 on the first carrier film 1, the ceramic green sheet 2, the adhesive layer 10, the inner electrode layer 8, the release layer 5 and the second carrier film 4 located in the surface-treated region 4a and inside of a region of the surface of the second carrier film 4 on which the release layer 5 is formed.

Figure 8:
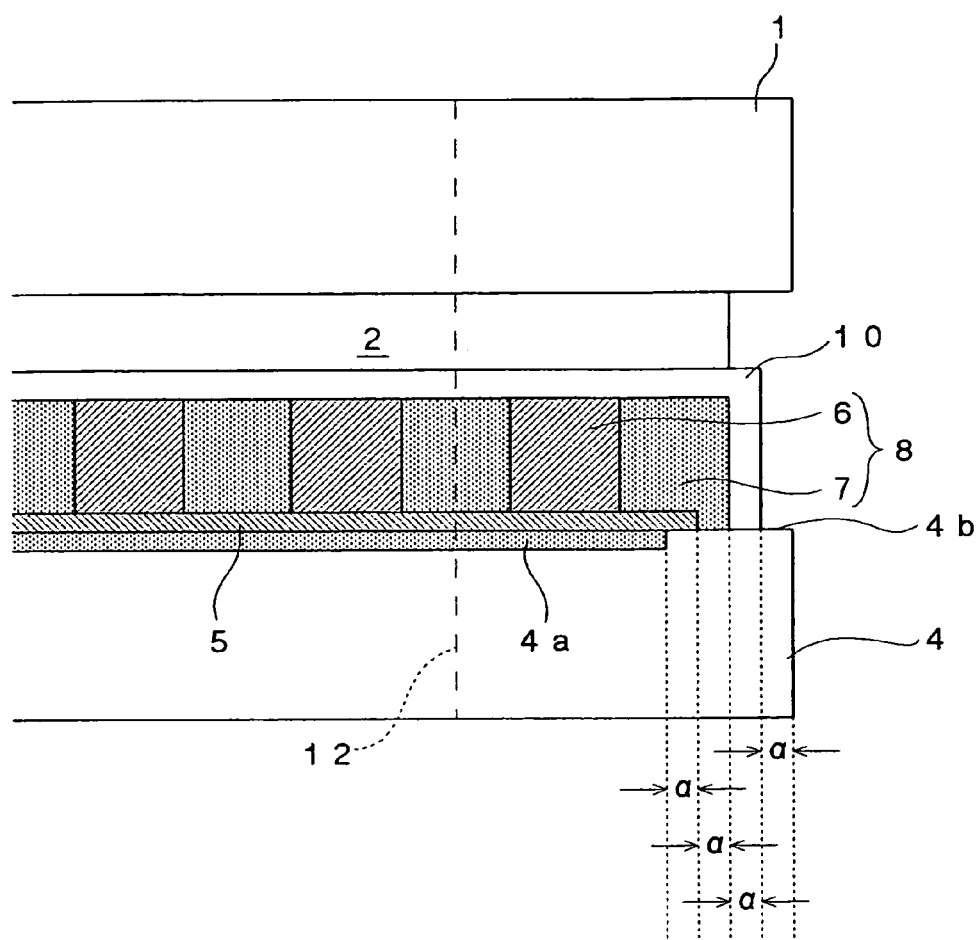
FIG. 8 is a schematic partial cross-sectional view showing how slit processing is performed on a laminated body obtained by bonding a ceramic green sheet and an inner electrode layer via an adhesive layer and including a first carrier film, the ceramic green sheet, the adhesive layer, the inner electrode layer, a release layer and a second carrier film.

FIG. 8 is a schematic partial cross-sectional view showing how slit processing is performed on a laminated body obtained by bonding the ceramic green sheet 2 and the inner electrode layer 8 via the adhesive layer 10 and including the first carrier film 1, the ceramic green sheet 2, the adhesive layer 10, the inner electrode layer 8, the release layer 5 and the second carrier film 4 and shows an ideal case where the ceramic green sheet 2 and the inner electrode layer 8 could be bonded to each other while suppressing the meandering width α of each of the first carrier film 1 and the second carrier film 4 to zero.

As shown in FIG. 8, in the thus fabricated laminated body, the adhesive layer 10 is securely bonded onto the non-surface-treated regions 4b on which no surface treatment for improving the releasability of the second carrier film is performed outside of the inner electrode layer 8. On the other hand, the ceramic green sheet 2 is formed so that one of the side edge portions thereof is located inside of the side edge portion of the adhesive layer 10 by α and the entire surface of the ceramic green sheet 2 is bonded onto the adhesive layer 10. Further, a slit 12 is formed in the surface-treated region 4a inside of the release layer 5 in a widthwise direction so as to penetrate the first carrier film 1, the ceramic green sheet 2, the adhesive layer 10, the inner electrode layer 8, the release layer 5 and the second carrier film 4.

In this embodiment, since the slit 12 is formed in the surface-treated region 4a inside of the release layer 5 in a widthwise direction so as to penetrate the first carrier film 1, the ceramic green sheet 2, the adhesive layer 10, the inner electrode layer 8, the release layer 5 and the second carrier film 4 in this manner and portions which should not be used for constituting a product are specified, it is possible to prevent a multi-layered unit from being erroneously cut in a subsequent step so as to contain portions which should not be used for constituting a product.

When the ceramic green sheet 2 formed on the first carrier film 1 has been bonded onto the inner electrode layer 8 including the electrode layer 6 and the spacer layer 7 formed on the second carrier film 4 via the adhesive layer 10 in this manner, the first carrier film 1 is peeled off from the ceramic green sheet 2.

In this embodiment, since the ceramic green sheet 2 is formed so that one of side edge portions thereof is located inside of the side edge portion of the adhesive layer 10 by α and is bonded onto the adhesive layer 10 on the entire surface thereof and the adhesive layer is securely bonded onto the non-surface-treated regions 4b on which no surface treatment for improving the releasability of the second carrier film is performed outside of the inner electrode layer 8, it is possible to reliably prevent the ceramic green sheet 2 from being removed together with the first carrier film 1 when the first carrier film 1 is peeled off from the ceramic green sheet 2.

Thus, a laminated body in which the release layer 5, the electrode layer 6, the spacer layer 7, the adhesive layer 10 and the ceramic green sheet 2 are laminated on the surface of second carrier film 4 is obtained.

Then, an adhesive layer 10 is of an adhesive sheet 11 is transferred onto the surface of the ceramic green sheet 2 similarly to the case where the adhesive layer 10 of the adhesive sheet 11 was transferred onto the electrode layer 6 and the spacer layer 7 formed on the second carrier film 4.

The thus obtained laminated body is cut to a predetermined size inside of the slit 12, thereby fabricating a multi-layered unit having a predetermined size and including the release layer 5, the electrode layer 6, the spacer layer 7, the adhesive layer 10, the ceramic green sheet 2 and the adhesive layer 10 laminated on the surface of the second carrier film 4.

Figure 9:
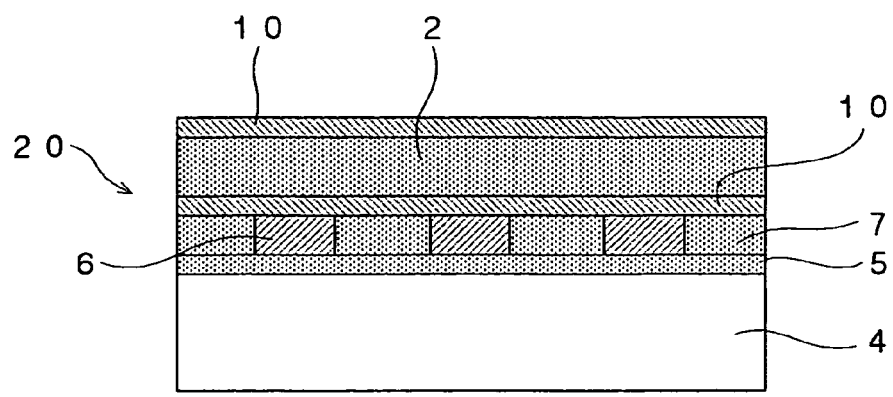
FIG. 9 is a schematic cross-sectional view showing a multi-layered unit obtained by laminating a release layer, an electrode layer, a spacer layer, an adhesive layer, a ceramic green sheet and an adhesive layer on a second carrier film.

FIG. 9 is a schematic cross-sectional view showing multi-layered unit 20 cut to a predetermined size in this manner.

As shown in FIG. 9, the multi-layered unit 20 is formed on the second carrier film 4 and includes the release layer 5, the electrode layer 6, the spacer layer 7, the adhesive layer 10, the ceramic green sheet 2 and the adhesive layer 10.

Similarly to the above, release layers 5, electrode layers 6, spacer layers 7, adhesive layers 10 and ceramic green sheets 2 are laminated on the surfaces of other second carrier films 4 and adhesive layers are transferred onto the ceramic green sheets 2 so as to fabricate a number of the multi-layered units 20 each including the release layer 5, the electrode layer 6, the spacer layer 7, the adhesive layer 10, the ceramic green sheet 2 and the adhesive layer 10.

A number of the thus fabricated multi-layered units 20 are laminated via the adhesive layer 10 transferred onto the surface of the ceramic green sheet 2 of each of the multi-layered units 20, thereby a multi-layered ceramic capacitor is manufactured.

Figure 10:
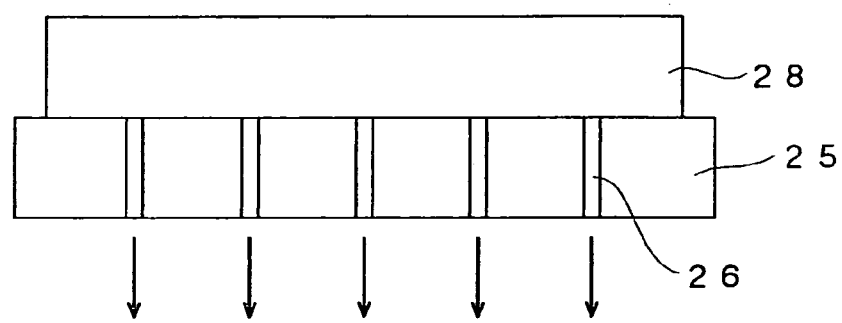
FIG. 10 is a schematic partial cross-sectional view showing a first step of a lamination process of multi-layered units.

FIG. 10 is a schematic partial cross-sectional view showing a first step of a lamination process of the multi-layered units 20.

As shown in FIG. 10, when a number of the multi-layered units 20 are to be laminated, a base substrate 28 is first set on a substrate 25 formed with a number of holes 26.

As the base substrate 28, a polyethylene terephthalate film or the like is employed.

The base substrate 28 is sucked with air via the plurality of holes 26 formed in the substrate 25, thereby fixing it at a predetermined position on the substrate 25.

Figure 11:
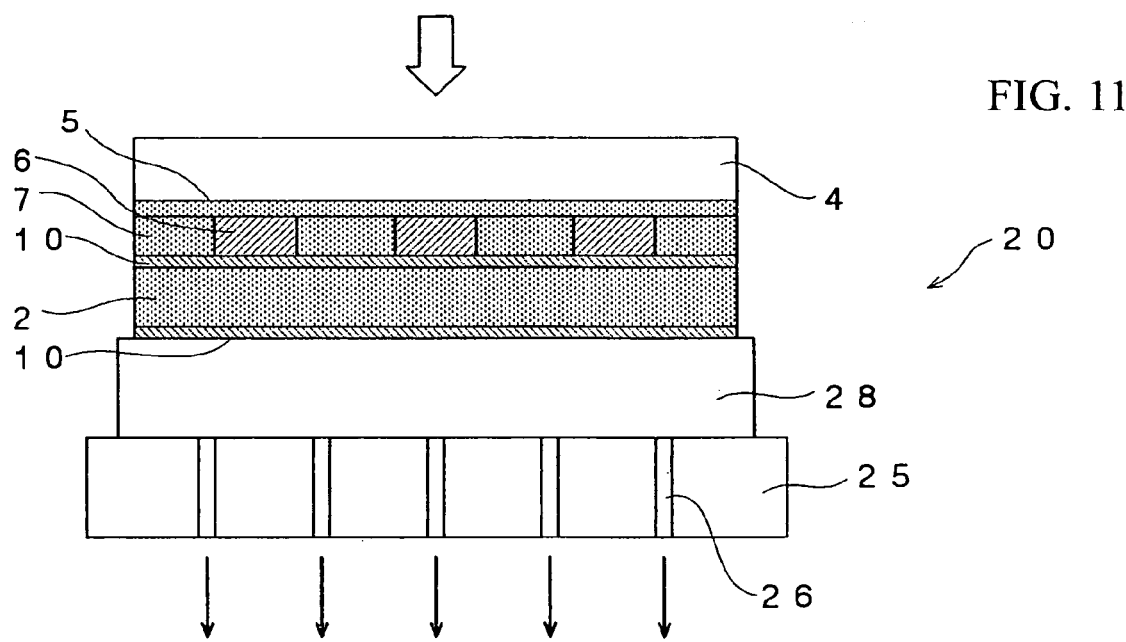
FIG. 11 is a schematic partial cross-sectional view showing a second step of a lamination process of multi-layered units.

FIG. 11 is a schematic partial cross-sectional view showing a second step of the lamination process of the multi-layered units 20.

As shown in FIG. 11, the multi-layered unit 20 is positioned so that the surface of the adhesive layer 10 transferred onto the surface of the ceramic green sheet 2 comes into contact with the surface of the base substrate 28 and a pressure is applied onto the second carrier film 4 of the multi-layered units 20 using a pressing machine or the like.

As a result, the multi-layered unit 20 is bonded onto the base substrate 28 fixed on the substrate 25 via the adhesive layer 10 transferred onto the surface of the ceramic green sheet 2.

Figure 12:
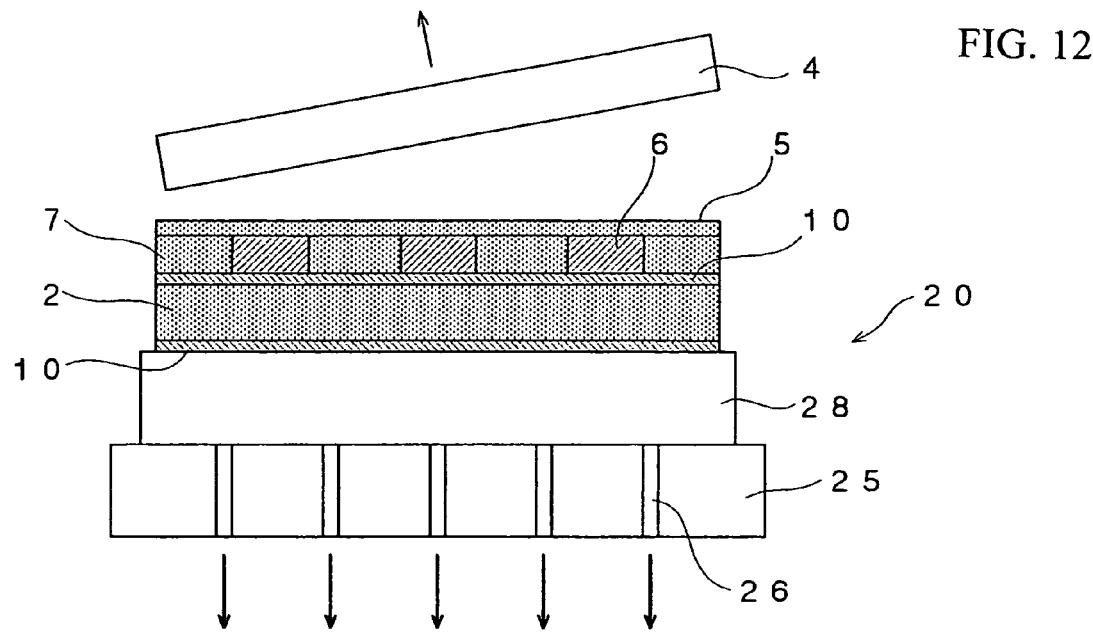
FIG. 12 is a schematic partial cross-sectional view showing a third step of a lamination process of multi-layered units.

FIG. 12 is a schematic partial cross-sectional view showing a third step of the lamination process of the multi-layered units 20.

When the multi-layered unit 20 has been bonded onto the base substrate 28 fixed on the substrate 25 via the adhesive layer 10 transferred onto the surface of the ceramic green sheet 2 to be laminated thereon, the second carrier film 4 is peeled off from the release layer 5 of the multi-layered units 20, as shown in FIG. 12.

At this time, portions of the adhesive layer 10, the inner electrode layer 8 and the release layer 5 which were securely bonded onto the non-surface-treated regions 4b on which no surface treatment for improving the releasability of the second carrier film 4 was performed have been cut off from the multi-layered unit 20 and only the release layer 5 is bonded onto the surface-treated region 4a on which surface treatment for improving the releasability of the second carrier film 4 was performed. Therefore, it is possible to peel off only the second carrier film 4 from the release layer 5 in a desired manner.

Further, in this embodiment, since the electrode layer 6 and the spacer layer 7 are formed so that ts/te is equal to 1.1, the spacer layer 7 is compressed by the pair of pressure rollers 17, 18, not only the spacer layer 7 but also the electrode layer 6 are bonded onto the surface of the ceramic green sheet 2 via the adhesive layer 10 and it is therefore possible to effectively prevent the electrode layer 6 from being peeled off from the ceramic green sheet 2 together with the second carrier film 4 when the second carrier film 4 is peeled off.

In this manner, the new multi-layered unit 20 is further laminated on the spacer layer 7 of the multi-layered unit 20 laminated on the base substrate 28 fixed onto the substrate 25 via the adhesive layer 10 transferred onto the surface of the ceramic green sheet 2.

Figure 13:
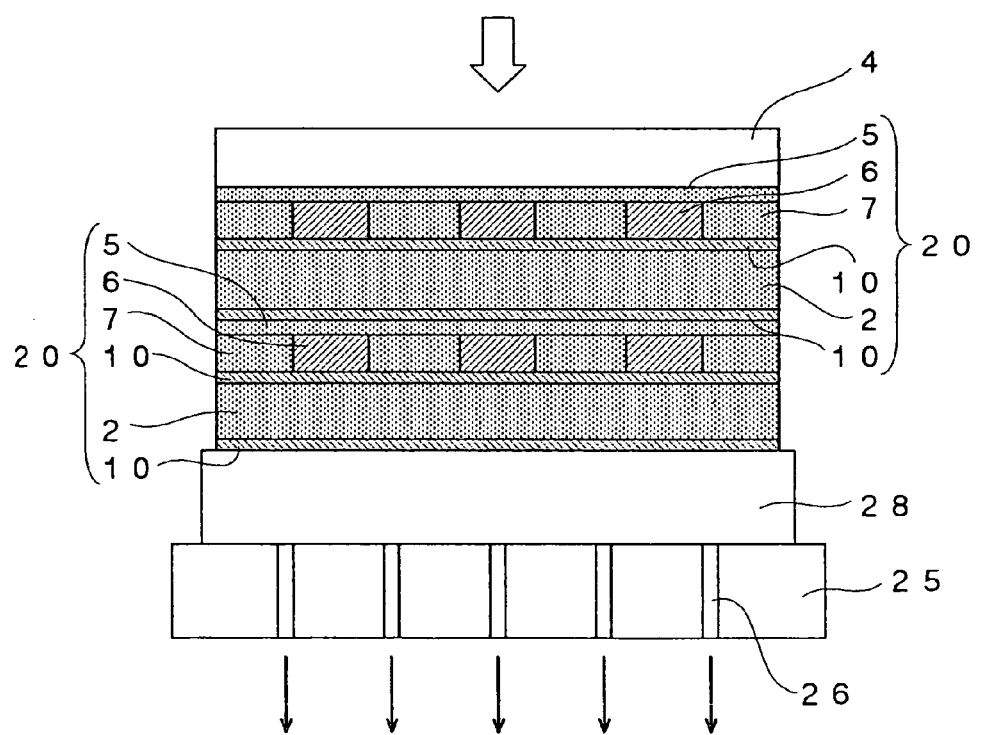
FIG. 13 is a schematic partial cross-sectional view showing a fourth step of a lamination process of multi-layered units.

FIG. 13 is a schematic partial cross-sectional view showing a fourth step of the lamination process of the multi-layered units 20.

As shown in FIG. 13, a new multi-layered unit 20 is positioned so that the surface of the adhesive layer 10 transferred onto the ceramic green sheet 2 comes into contact with the surface of the release layer 5 of the multi-layered unit 20 bonded onto the base substrate 28 fixed to the substrate 25 and pressure is applied to the second carrier film 4 of the new multi-layered unit 20 using a pressing machine or the like.

As a result, the new multi-layered unit 20 is laminated on the multi-layered unit 20 bonded onto the base substrate 28 fixed to the substrate 25 via the adhesive layer 10 transferred onto the ceramic green sheet 2.

Figure 14:
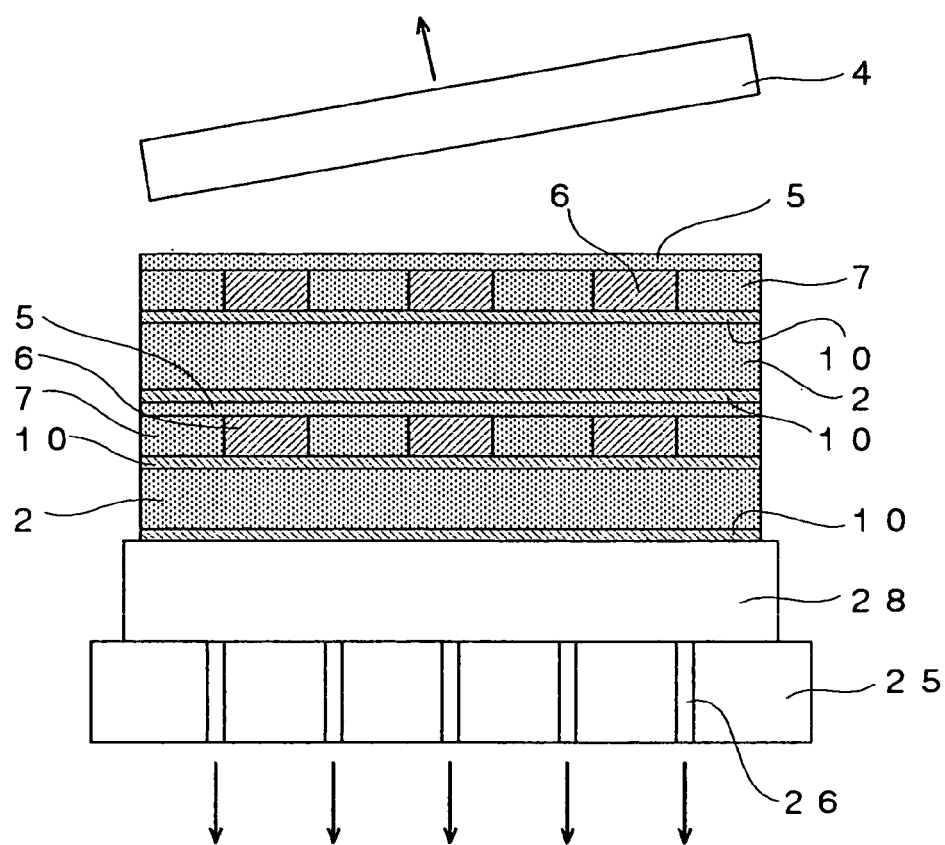
FIG. 14 is a schematic partial cross-sectional view showing a fifth step of a lamination process of multi-layered units.
Figure 15:
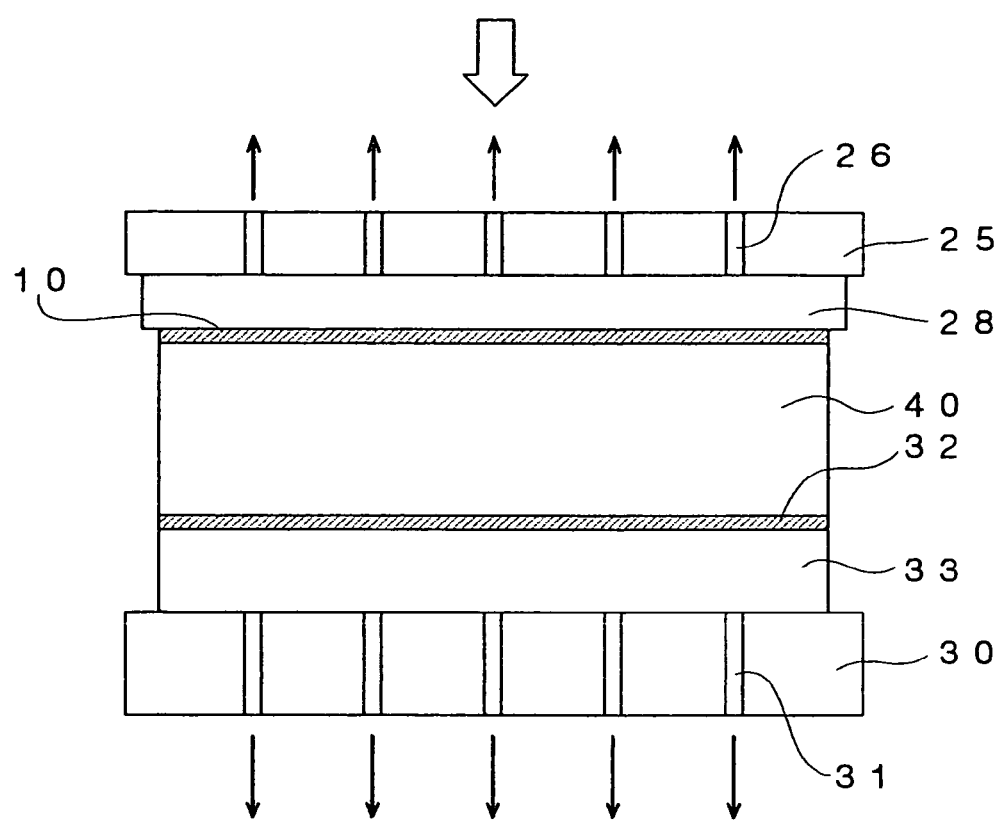
FIG. 15 is a schematic partial cross-sectional view showing a first step of a lamination process of for laminating a multi-layered block laminated on a carrier film fixed to a substrate on a cover layer of a multi-layered ceramic capacitor.

FIG. 14 is a schematic partial cross-sectional view showing a fifth step of the lamination process of the multi-layered units 20.

When the new multi-layered unit 20 has been laminated on the multi-layered unit 20 bonded onto the base substrate 28 fixed to the substrate 25 via the adhesive layer 10 transferred onto the ceramic green sheet 2, the second carrier film 4 of the new multi-layered unit 20 is peeled off from the release layer 5 of the multi-layered unit 20, as shown in FIG. 14.

Similarly to the above, multi-layered units 20 are sequentially laminated and a predetermined number of multi-layered units 20 are laminated on the base substrate 28 fixed to the substrate 25, thereby fabricating a multi-layered block.

When a predetermined number of the multi-layered units 20 have been laminated on the base substrate 28 fixed to the substrate 25, thereby fabricating the multi-layered block, the multi-layered block fabricated by laminating a predetermined number of the multi-layered units 20 on the base substrate 28 fixed to the substrate 25 is laminated on a cover layer of a multi-layered ceramic capacitor.

FIG. 13 is a schematic partial cross-sectional view showing a first step of a lamination process of for laminating the multi-layered block laminated on the base substrate 28 fixed to the substrate 25 on the cover layer of the multi-layered ceramic capacitor.

As shown in FIG. 13, a cover layer 33 formed with an adhesive layer 10 is set on a base 30 formed with a number of holes 31.

The cover layer 33 is sucked with air via the number of the holes 31 formed in the base 30 and fixed at a predetermined position on the base 30.

As shown in FIG. 13, the multi-layered block 40 laminated on the base substrate 28 sucked with air via a number of the holes 26 and fixed at a predetermined position on the substrate 25 is then positioned so that the surface of the release layer 5 of the last laminated multi-layered unit 20 comes into contact with the surface of an adhesive layer 32 formed on the cover layer 33.

Then, the suction operation with air via the number of the holes 26 is stopped and the substrate 25 is removed from the base substrate 28 supporting the multi-layered block 40.

When the substrate 25 has been removed from the base substrate 28, a pressure is applied onto the base substrate 28 using a pressing machine or the like.

As a result, the multi-layered block 40 is bonded onto the cover layer 33 fixed to the base 30 via the adhesive layer 32 and laminated thereon.

Figure 16:
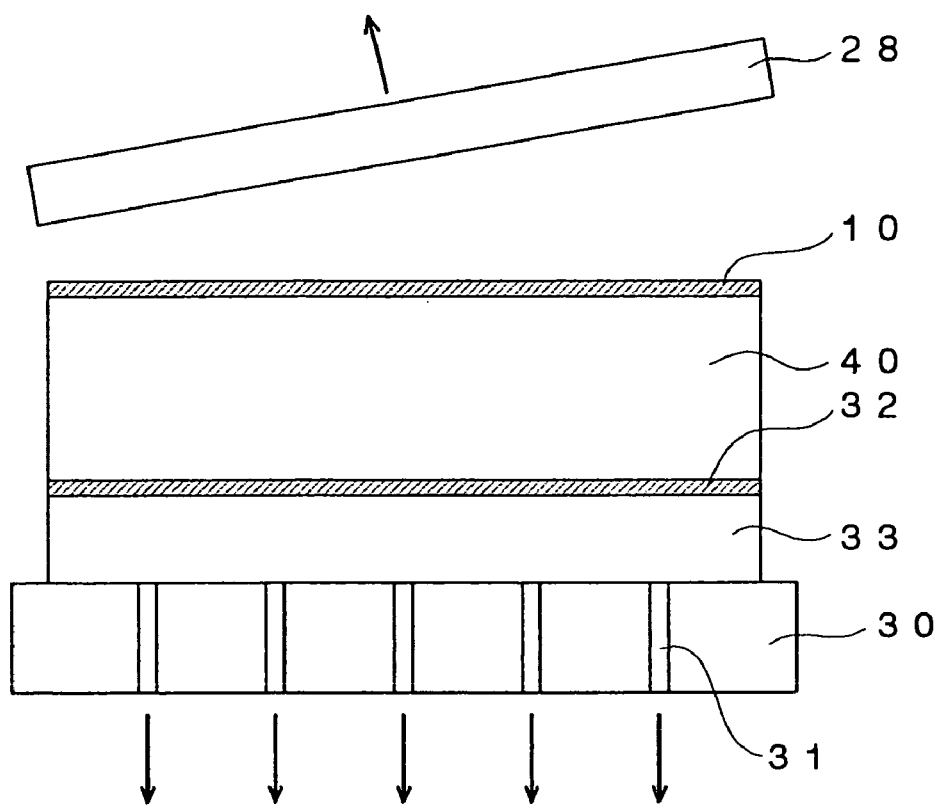
FIG. 16 is a schematic partial cross-sectional view showing a second step of a lamination process of for laminating a multi-layered block laminated on a carrier film fixed to a substrate on a cover layer of a multi-layered ceramic capacitor.

FIG. 16 is a schematic partial cross-sectional view showing a second step of a lamination process for laminating the multi-layered block 40 laminated on the base substrate 28 fixed to the substrate 25 on the cover layer 33 of the multi-layered ceramic capacitor.

When the multi-layered block 40 has been bonded via the adhesive layer 32 onto the cover layer 33 fixed to the base 30 and laminated thereon, the base substrate 28 is peeled off from the adhesive layer 10 of the multi-layered block 40, as shown in FIG. 16.

In this manner, the multi-layered block 40 including a predetermined number of the laminated multi-layered units 20 is laminated on the cover layer 33 fixed onto the base 30 via the adhesive layer 32.

When the multi-layered block 40 is laminated on the cover layer 33 fixed onto the base 30 via the adhesive layer 32, in accordance with the steps shown in FIGS. 10 to 14, a new multi-layered block 40 fabricated by laminating a predetermined number of multi-layered units 20 on the base substrate 28 fixed onto the base 30 is further laminated on the adhesive layer 10 of the uppermost multi-layered unit 20 of the multi-layered block 40 laminated on the cover layer 33 fixed onto the base 30.

Figure 17:
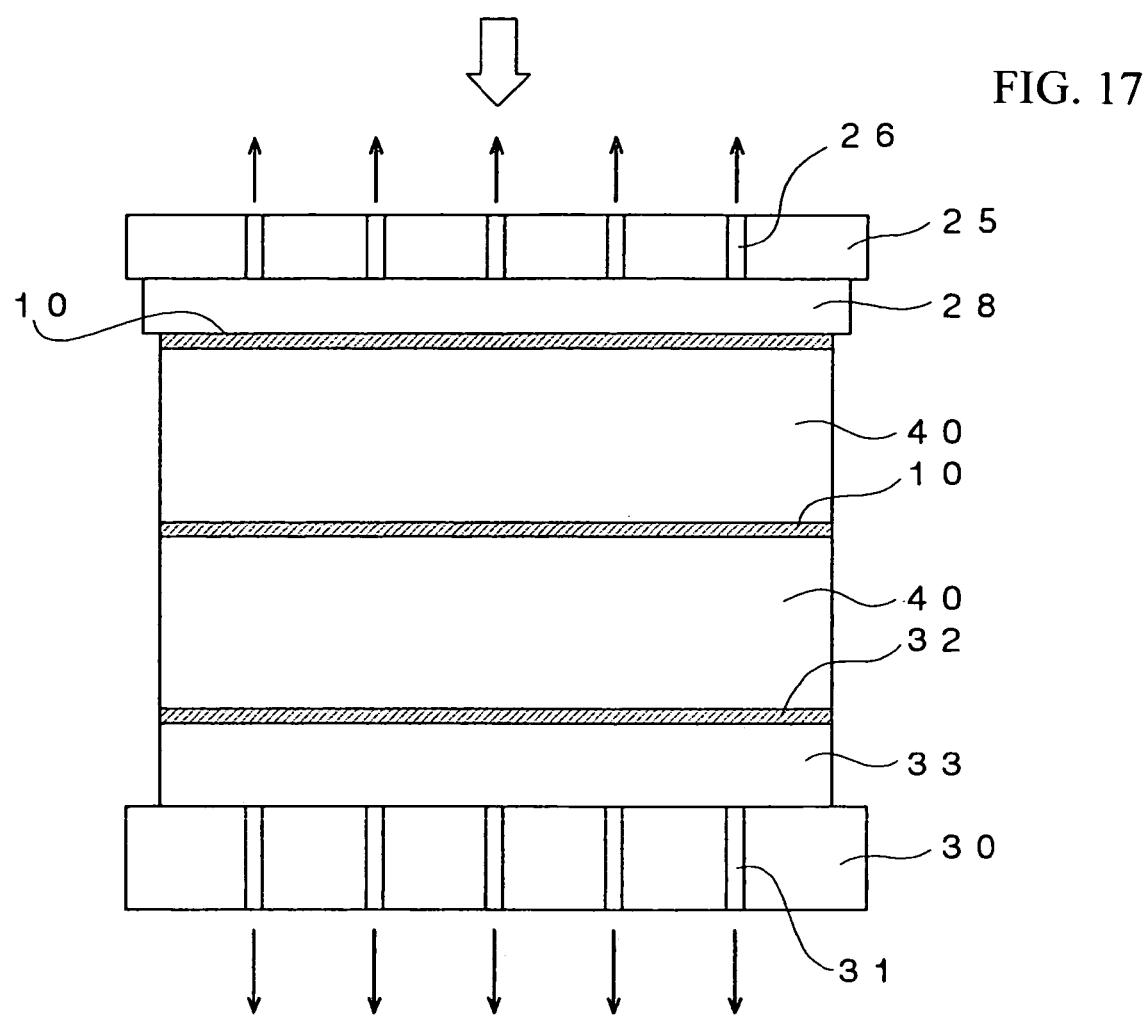
FIG. 17 is a schematic partial cross-sectional view showing a third step of a lamination process of for laminating a multi-layered block laminated on a carrier film fixed to a substrate on a cover layer of a multi-layered ceramic capacitor.

FIG. 17 is a schematic partial cross-sectional view showing a third step of a lamination process of for laminating the multi-layered block 40 laminated on the base substrate 28 fixed to the substrate 25 on the cover layer 33 of the multi-layered ceramic capacitor.

As shown in FIG. 17, the multi-layered block 40 newly laminated on the base substrate 28 sucked with air via a number of the holes 26 and fixed at a predetermined position on the substrate 25 is positioned so that the surface of the release layer 5 of the last laminated multi-layered unit 20 comes into contact with the surface of the adhesive layer 10 of the uppermost multi-layered unit 20 of the multi-layered block 40 laminated on the cover layer 33 fixed onto the base 30.

Then, the suction operation with air via the number of the holes 26 is stopped and the substrate 25 is removed from the base substrate 28 supporting the multi-layered block 40.

When the substrate 25 has been removed from the base substrate 28, a pressure is applied onto the base substrate 28 using a pressing machine or the like.

As a result, the newly laminated multi-layered block 40 is bonded onto the multi-layered block 40 laminated on the cover layer 33 fixed onto the base 30 via the adhesive layer 10 and laminated thereon.

Figure 18:
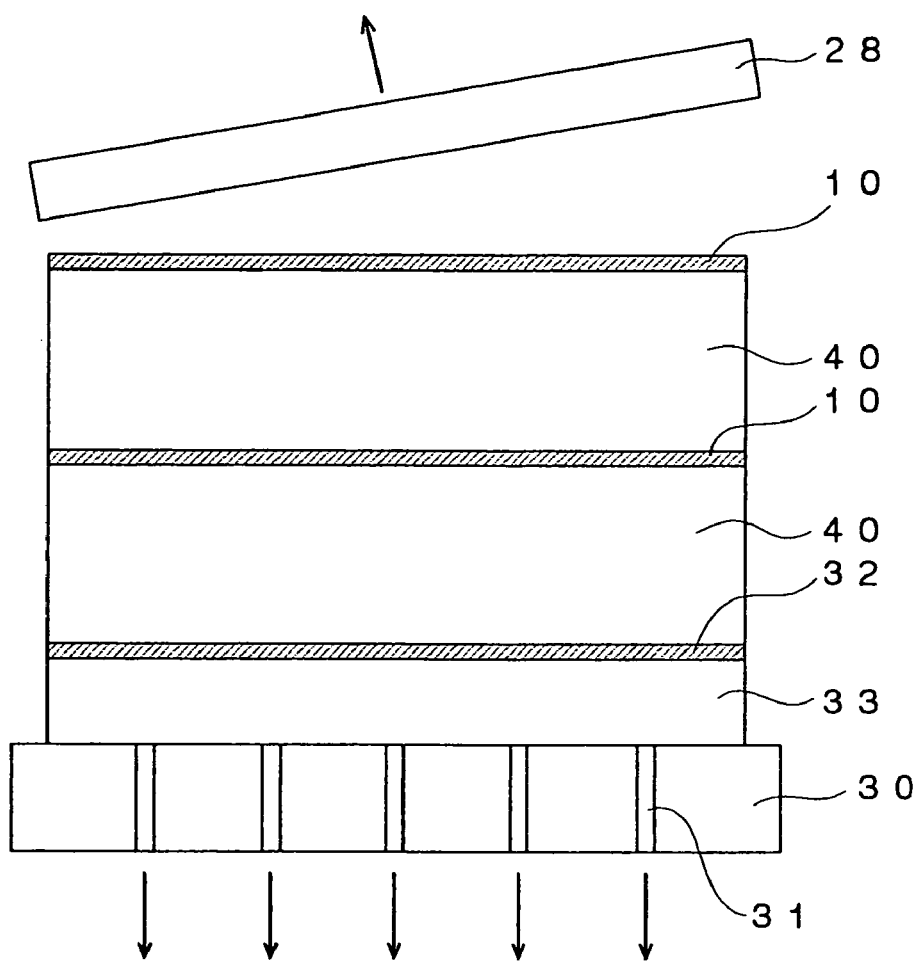
FIG. 18 is a schematic partial cross-sectional view showing a fourth step of a lamination process of for laminating a multi-layered block laminated on a carrier film fixed to a substrate on a cover layer of a multi-layered ceramic capacitor.

FIG. 18 is a schematic partial cross-sectional view showing a fourth step of a lamination process of for laminating the multi-layered block 40 laminated on the base substrate 28 fixed to the substrate 25 on the cover layer 33 of the multi-layered ceramic capacitor.

When the newly laminated multi-layered block 40 has been bonded via the adhesive layer 10 onto the multi-layered block 40 laminated on the cover layer 33 fixed onto the base 30 and laminated thereon, the base substrate 28 is peeled off from the adhesive layer 10 of the newly laminated multi-layered block 40, as shown in FIG. 18.

In this manner, the new multi-layered block 40 is bonded via the adhesive layer 10 onto the multi-layered block 40 laminated on the cover layer 33 fixed onto the base 30 and is laminated thereon.

Similarly to the above, multi-layered blocks 40 each laminated on the base substrate 28 fixed onto the substrate 25 are sequentially laminated and a predetermined number of the multi-layered blocks 40, and, therefore, a predetermined number of the multi-layered units 20, are laminated on the cover layer 33 of the multi-layered ceramic capacitor.

When a predetermined number of the multi-layered units 20 have been laminated on the cover layer 33 of the multi-layered ceramic capacitor in this manner, another cover layer (not shown) is bonded onto them via an adhesive layer, thereby fabricating a laminated body including a predetermined number of the multi-layered units 20.

Then, the laminated body including the predetermined number of the multi-layered units 20 is cut to a predetermined size, thereby fabricating a number of ceramic green chips.

The thus fabricated ceramic green chips are placed in a reducing gas atmosphere so that the binder is removed therefrom and the ceramic green chips are- baked.

Necessary external electrodes are then attached to the thus baked ceramic green chip, thereby manufacturing a multi-layered ceramic capacitor.

According to the above described embodiment, the ceramic green sheet 2 and the inner electrode layer 8 including the electrode and spacer layers 6, 7 are bonded to each other via the adhesive layer 10 and, unlike in the conventional process, they are not bonded utilizing the agglutinant forces of binders contained in the ceramic green sheet 2, the electrode layer 6 and spacer layer 7 or the deformation of the ceramic green sheet 2, the electrode layer 6 and the spacer layer 7. It is therefore possible to bond the ceramic green sheet 2 and the inner electrode layer 8 including the electrode and the spacer layers 6, 7 with a low pressure such as about 0.2 MPa to about 15 Mpa.

Therefore, since it is possible to prevent the ceramic green sheet 2, the electrode layer 6 and the spacer layer 7 from deforming, a multi-layered ceramic capacitor can be manufactured with high accuracy by laminating the thus formed laminated bodies including the ceramic green sheet 2 and the inner electrode layer 8 including the electrode layer 6 and the spacer layer 7.

Further, according to the above described embodiment, the electrode layer 6 formed on the second carrier film 4 is bonded onto the surface of the ceramic green sheet 2 via the adhesive layer 10 after the electrode layer 6 has been dried. Therefore, unlike in the case where the electrode layer 6 is formed by printing an electrode paste on the surface of the ceramic green sheet 2, the electrode paste neither dissolves nor swells the binder contained in the ceramic green sheet 2 and the electrode paste does not seep into the ceramic green sheet 2. It is therefore possible to form the electrode layer 6 on the surface of the ceramic green sheet 2.

Furthermore, in the above described embodiment, the surface of the second carrier film 4 is formed with a surface-treated region 4a coated with a silicon resin, an alkyd resin or the like in order to improve the releasability of the second carrier film 4 and non-surface-treated regions 4b on which no surface treatment for improving the releasability of the second carrier film 4 is performed on both sides of the surface-treated region 4a and the release layer 5 is formed by coating the surface of the second carrier film 4 with the dielectric paste so that the width of the release layer is narrower than the that of the second carrier film 4 by 6α and wider than that of the surface-treated region 4a by 2α, and the inner electrode layer 8 including the electrode layer 6 and the spacer layer 7 is formed by printing the surface of the second carrier film with the electrode paste and the dielectric paste so that the width of the inner electrode layer is narrower than that of the second carrier film 4 by 4a and wider than that of the release layer 5 by 2α. Therefore, portions of the release layer 5 and the inner electrode layer 8 in the vicinity of opposite side edge portions thereof are formed on the non-surface-treated regions 4b on which no surface treatment for improving the releasability of the second carrier film is performed.

Moreover, in the above described embodiment, the adhesive layer 10 is formed by coating the surface of the third carrier film 9 with the adhesive agent solution so that the width of the adhesive layer 10 is narrower than that of the third carrier film 9 by 2α, wider than the width of the ceramic green sheet 2 formed on the surface of the first carrier film 1 and the widths of the release layer 5 and the inner electrode layer 8 formed on the surface of the second carrier film 4 by 2α and wider than the width of the surface-treated region 4a of the second carrier film 4 by 2α. When the adhesive layer 10 is transferred onto the surface of the inner electrode layer 8, the adhesive layer 10 is pressed by the pair of pressure rollers 15, 16 and securely bonded onto the non-surface-treated regions 4b on which no surface treatment for improving the releasability of the second carrier film is performed outside of the inner electrode layer 8.

Further, in the above described embodiment, the ceramic green sheet 2 is formed by coating the surface of the first carrier film 1 with the dielectric paste so that the width of the ceramic green sheet 2 is narrower than that of the first carrier film 1 by 4α and the same as that of the inner electrode layer 8 including the electrode layer 6 and the spacer layer 7, and when the ceramic green sheet 2 is bonded onto the inner electrode layer 8 via the adhesive layer 10, the entire surface of the ceramic green sheet 2 is bonded onto the adhesive layer 10.

Therefore, according to the above described embodiment, since the adhesive layer 10 is formed by coating the surface of the third carrier film 9 with the adhesive agent solution so that the width of the adhesive layer 10 is narrower than that of the third carrier film 9 by 2α, it is possible when transferring the adhesive layer 10 onto the surface of the inner electrode layer 8 formed on the second carrier film 4 to reliably prevent the adhesive layer 10 from being located outside of the second carrier film 4 in a widthwise direction and it is therefore possible to reliably prevent the adhesive layer 10 from being bonded onto the surface of the transfer roller 16.

Further, according to the above described embodiment, since the entire surface of the ceramic green sheet 2 is bonded onto the adhesive layer 10 securely bonded onto the non-surface-treated regions 4b on which no surface treatment for improving the releasability of the second carrier film 4 is performed outside of the inner electrode layer 8, it is possible when peeling the first carrier film 1 off from the ceramic green sheet 2 to reliably prevent the ceramic green sheet 2 from being removed together with the first carrier film 1 and the process from being contaminated by the thus removed ceramic green sheet 2.

Moreover, according to the above described embodiment, after the ceramic green sheet 2 and the inner electrode layer 8 have been bonded to each other via the adhesive layer 10 by the pair of pressure rollers 17, 18, slit processing is performed by the slit processing machine 19 on the first carrier film 1, the ceramic green sheet 2, the adhesive layer 10, the inner electrode layer 8, the release layer 5 and the second carrier film 4 located in the surface-treated region 4a and inside of a region of the surface of the second carrier film 4 on which the release layer 5 is formed and portions which should not be used for constituting a product are specified by the slit 12. It is therefore possible to prevent a multi-layered unit from being erroneously cut in a subsequent step so as to contain portions which should not be used for constituting a product.

Furthermore, according to the above described embodiment, the electrode layer 6 and the spacer layer 7 whose density is lower than that of the electrode layer 6 and whose compression ratio is higher than that of the electrode layer 6 are formed so that ts/te is equal to 1.1. As a result, when the electrode layer 6 and the spacer layer 7 are transferred onto the surface of the ceramic green sheet 2 via the adhesive layer 10, the spacer layer 7 is compressed by the pair of pressure rollers 17, 18 and not only the spacer layer 7 but also the electrode layer 6 are bonded onto the surface of the ceramic green sheet 2 via the adhesive layer 10. Therefore, it is possible to effectively prevent the electrode layer 6 from being peeled off from the ceramic green sheet 2 together with the second carrier film 4 when the second carrier film 4 is peeled off.

Further, the third carrier film 9 would become difficult to peel off from the adhesive layer 10 if static charge generated in the course of the peeling should cause dust to attach to the adhesive layer 10 and attract the adhesive layer 10 to the third carrier film 9. However, according to the above described embodiment, generation of static charge can be effectively prevented because the adhesive layer 10 contains an imidazoline system surfactant in an amount of 0.01 weight % to 15 weight % of the binder.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment, the laminated body including the first carrier film 1, the ceramic green sheet 2, the adhesive layer 10, the inner electrode layer 8, the release layer 5 and the second carrier film 4 is fabricated by coating the surface of the second carrier film 4 with the dielectric paste so that the width of the release layer 5 is narrower than the that of the second carrier film 4 by 6α and wider than that of the surface-treated region 4a by at least 4α, thereby forming the release layer 5, printing the electrode paste and the dielectric paste onto the surface of the second carrier film 4 so that the width of the inner electrode layer 8 is narrower than that of the second carrier film 4 by 4α and wider than that of the release layer 5 by 2α, thereby forming the inner electrode layer 8 including the electrode layer 6 and the spacer layer 7, coating the surface of the first carrier film 1 with the dielectric paste so that the width of the ceramic green sheet 2 is narrower than that of the first carrier film 1 by 4α and the same as that of the inner electrode layer 8 including the electrode layer 6 and the spacer layer 7, thereby forming the ceramic green sheet 2, and coating the surface of the third carrier film 9 with the adhesive agent solution so that the width of the adhesive layer 10 is narrower than the width of the third carrier film 9, wider than the width of the ceramic green sheet 2 formed on the surface of the first carrier film 1 and the widths of the release layer 5 and the inner electrode layer 8 formed on the surface of the second support layer 4 by 2α and wider than the width of the surface-treated region 4a of the second carrier film 4 by 2α, thereby forming the adhesive layer 10. However, it is sufficient to fabricate the laminated body including the first carrier film 1, the ceramic green sheet 2, the adhesive layer 10, the inner electrode layer 8, the release layer 5 and the second carrier film 4 by coating the surface of the third carrier film 9 with the adhesive agent solution so that the width of the adhesive layer 10 is narrower than the width of the third carrier film 9, wider than the width of the ceramic green sheet 2 formed on the surface of the first carrier film 1 and the widths of the release layer 5 and the inner electrode layer 8 formed on the surface of the second support layer 4 by at least 2α and wider than the width of the surface-treated region 4a of the second carrier film 4 by at least 2α and it is not absolutely necessary to fabricate the laminated body including the first carrier film 1, the ceramic green sheet 2, the adhesive layer 10, the inner electrode layer 8, the release layer 5 and the second carrier film 4 by coating the surface of the second carrier film 4 with the dielectric paste so that the width of the release layer 5 is narrower than the that of the second carrier film 4 by 6α and wider than that of the surface-treated region 4a by at least 4α, thereby forming the release layer 5, printing the electrode paste and the dielectric paste onto the surface of the second carrier film 4 so that the width of the inner electrode layer 8 is narrower than that of the second carrier film 4 by 4α and wider than that of the release layer 5 by 2α, thereby forming the inner electrode layer 8 including the electrode layer 6 and the spacer layer 7, coating the surface of the first carrier film 1 with the dielectric paste so that the width of the ceramic green sheet 2 is narrower than that of the first carrier film 1 by 4α and the same as that of the inner electrode layer 8 including the electrode layer 6 and the spacer layer 7, thereby forming the ceramic green sheet 2, and coating the surface of the third carrier film 9 with the adhesive agent solution so that the width of the adhesive layer 10 is narrower than the width of the third carrier film 9, wider than the width of the ceramic green sheet 2 formed on the surface of the first carrier film 1 and the widths of the release layer 5 and the inner electrode layer 8 formed on the surface of the second support layer 4 by 2α and wider than the width of the surface-treated region 4a of the second carrier film 4 by 2α, thereby forming the adhesive layer 10.

Further, in the above described embodiment, although the ceramic green sheet 2 and the inner electrode layer 8 are bonded to each other via the adhesive layer 10 by the pair of pressure rollers 17, 18 and slit processing is then performed by the slit processing machine 19 on the first carrier film 1, the ceramic green sheet 2, the adhesive layer 10, the inner electrode layer 8, the release layer 5 and the second carrier film 4 located in the surface-treated region 4a and inside of a region of the surface of the second carrier film 4 on which the release layer 5 is formed, it is not absolutely necessary to perform slit processing on the first carrier film 1, the ceramic green sheet 2, the adhesive layer 10, the inner electrode layer 8, the release layer 5 and the second carrier film 4.

Furthermore, in the above described embodiment, the electrode layer 6 and the spacer layer 7 are formed on the release layer 5 so that ts/te is equal to 1.1, where ts is the thickness of the spacer layer 7 and te is the thickness of the electrode layer 6. However, it is sufficient to form an electrode layer 6 and a spacer layer 7 on the release layer 5 so that ts/te is equal to or larger than 0.7 and equal to or smaller than 1.2, preferably equal to or larger than 0.8 and equal to or smaller than 1.2 and more preferably equal to or larger than 0.9 and equal to or smaller than 1.2, and it is not absolutely necessary to form the electrode layer 6 and the spacer layer 7 on the release layer 5 so that ts/te is equal to 1.1.

Moreover, in the above described embodiment, although an imidazoline system surfactant is added to the adhesive agent solution, it is not absolutely necessary to add an imidazoline system surfactant to the adhesive agent solution.

Further, in the above described embodiment, the ceramic green sheet 2 is bonded onto the surfaces of the electrode layer 6 and the spacer layer 7 via the adhesive layer 10 using the adhering apparatus shown in FIG. 7 and the first carrier film 1 is then peeled off from the ceramic green sheet 2. However, it is possible to bond the ceramic green sheet 2 onto the surfaces of the electrode layer 6 and the spacer layer 7 via the adhesive layer 10 and peel off the first carrier film 1 from the ceramic green sheet 2 using the adhering and peeling apparatus shown in FIG. 6.

According to the present invention, it is possible to provide a method for manufacturing a multi-layered unit for a multi-layered ceramic electronic component which can prevent a ceramic green sheet from being deformed and destroyed and prevent a solvent contained in an electrode paste from sinking into a ceramic green sheet, thereby enabling manufacture of a multi-layered unit including a ceramic green sheet and an electrode layer laminated to each other in a desired manner.

The invention claimed is:

1. A method for manufacturing a multi-layered unit for a multi-layered ceramic electronic component comprising:
   a step of forming a ceramic green sheet on the surface of a first carrier film;
   a step of forming a release layer on the surface of a second carrier film including a surface-treated region on which a surface treatment is performed for improving releasability and a non-surface-treated regions on which no surface treatment is performed on both sides of the surface-treated region and having a width substantially equal to that of the first carrier film;
   a step of forming an electrode layer in a predetermined pattern and a spacer layer in a complementary pattern to that of the electrode layer on the surface of the release layer, thereby forming an inner electrode layer;

a step of forming an adhesive layer on the surface of a third carrier film having a width substantially equal to that of the second carrier film;

a step of bringing the surface of the adhesive layer formed on the third carrier film and the surface of the inner electrode layer into close contact with each other and pressing them, thereby bonding the adhesive layer onto the surface of the inner electrode layer;

a step of peeling off the third carrier film from the adhesive layer;

a step of pressing and bonding the ceramic green sheet formed on the surface of the first carrier film and the inner electrode layer formed on the surface of the second carrier film onto each other via the adhesive layer; and a step of peeling off the first carrier film from the ceramic green sheet, thereby fabricating a multi-layered unit including the ceramic green sheet and the inner electrode layer laminated onto each other, wherein the adhesive layer is formed by coating the surface of the third carrier film with an adhesive agent solution so that the width of the adhesive layer is:

narrower than the width of the third carrier film by at least $2\alpha$, wherein the third carrier film is conveyed by a sheet conveying mechanism and $\alpha$ is a positive value defined as the maximum width within which one side of a sheet may meander when the sheet is conveyed by the sheet conveying mechanism and is a value inherent to the sheet conveying mechanism;

wider than the width of the ceramic green sheet formed on the surface of the first carrier film and the widths of the release layer and the inner electrode layer formed on the surface of the second carrier film by at least $2\alpha$; and wider than the width of the surface-treated region of the second carrier film by at least $2\alpha$.

2. A method for manufacturing a multi-layered unit for a multi-layered ceramic electronic component in accordance with claim 1, wherein the inner electrode layer is formed by printing the surface of the second carrier film with an electrode paste and a dielectric paste so that the width of the inner electrode layer is wider than that of the surface-treated region by at least $2\alpha$.

3. A method for manufacturing a multi-layered for a multi-layered ceramic electronic component in accordance with claim 2, wherein the release layer is formed by coating the surface of the second carrier film with a dielectric paste so that the width of the release layer is wider than that of the surface-treated region by at least $2\alpha$ and the inner electrode layer is formed by printing the surface of the second carrier film with an electrode paste and a dielectric paste so that the width of the inner electrode layer is wider than that of the release layer by at least $2\alpha$.

4. A method for manufacturing a multi-layered for a multi-layered ceramic electronic component in accordance with claim 3, wherein slit processing is performed on the first carrier film, the ceramic green sheet, the adhesive layer, the inner electrode layer, the release layer and the third carrier film in the surface-treated region inside of a region on which the release layer is to be formed by coating the surface of the second carrier film with the dielectric paste.

5. A method for manufacturing a multi-layered for a multi-layered ceramic electronic component in accordance with claim 4, wherein surface treatment is performed on the surface of the first carrier film for improving the releasability thereof and the ceramic green sheet is formed on a region on which the surface treatment is performed.

6. A method for manufacturing a multi-layered for a multi-layered ceramic electronic component in accordance with claim 3, wherein surface treatment is performed on the surface of the first carrier film for improving the releasability thereof and the ceramic green sheet is formed on a region on which the surface treatment is performed.

7. A method for manufacturing a multi-layered for a multi-layered ceramic electronic component in accordance with claim 2, wherein surface treatment is performed on the surface of the first carrier film for improving the releasability thereof and the ceramic green sheet is formed on a region on which the surface treatment is performed.

8. A method for manufacturing a multi-layered for a multi-layered ceramic electronic component in accordance with claim 1, wherein surface treatment is performed on the surface of the first carrier film for improving the releasability thereof and the ceramic green sheet is formed on a region on which the surface treatment is performed.

9. A method for manufacturing a multi-layered for a multi-layered ceramic electronic component in accordance with claim 1, wherein after the electrode layer was formed on the release layer, the spacer layer is formed on the release layer in a complementary pattern to that of the electrode layer.

10. A method for manufacturing a multi-layered for a multi-layered ceramic electronic component in accordance with claim 1, wherein after the spacer layer was formed on the release layer in a complementary pattern to that of the electrode layer to be formed on the release layer, the electrode layer is formed on the release layer.

11. A method for manufacturing a multi-layered for a multi-layered ceramic electronic component in accordance with claim 1, wherein the adhesive layer contains dielectric particles having the same composition as that of dielectric particles contained in the ceramic green sheet.

12. A method for manufacturing a multi-layered for a multi-layered ceramic electronic component in accordance with claim 1, wherein the adhesive layer contains a binder belonging to the same binder group as that a binder contained in the ceramic green sheet belongs to.

13. A method for manufacturing a multi-layered for a multi-layered ceramic electronic component in accordance with claim 1, wherein the spacer layer contains dielectric particles having the same composition as that of dielectric particles contained in the ceramic green sheet.

14. A method for manufacturing a multi-layered for a multi-layered ceramic electronic component in accordance with claim 1, wherein the spacer layer contains a binder belonging to the same binder group as that a binder contained in the ceramic green sheet belongs to.

15. A method for manufacturing a multi-layered for a multi-layered ceramic electronic component in accordance with claim 1, wherein the adhesive layer is formed so as to have a thickness equal to or thinner than 0.1 μm.

16. A method for manufacturing a multi-layered for a multi-layered ceramic electronic component in accordance with claim 1, wherein the ceramic green sheet is formed so as to have a thickness equal to or thinner than 3 μm.

17. A method for manufacturing a multi-layered for a multi-layered ceramic electronic component in accordance with claim 1, wherein the inner electrode layer and the adhesive layer is pressed to each other under a pressure of about 0.2 MPa to about 15 Mpa.

* * * * *